(12) United States Patent
Chen et al.

(10) Patent No.: US 11,963,205 B2
(45) Date of Patent: Apr. 16, 2024

(54) RESOURCE MANAGEMENT METHOD AND APPARATUS

(71) Applicant: Huawei Technologies Co., Ltd., Shenzhen (CN)

(72) Inventors: Lei Chen, Chengdu (CN); Peng Guan, Shenzhen (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 554 days.

(21) Appl. No.: 17/175,279

(22) Filed: Feb. 12, 2021

(65) Prior Publication Data

US 2021/0185690 A1    Jun. 17, 2021

Related U.S. Application Data

(63) Continuation of application No. PCT/CN2019/099102, filed on Aug. 2, 2019.

(30) Foreign Application Priority Data

Aug. 14, 2018   (CN) .......................... 201810923254.9

(51) Int. Cl.
*H04W 72/04*        (2023.01)
*H04L 1/1607*       (2023.01)
(Continued)

(52) U.S. Cl.
CPC ........... *H04W 72/53* (2023.01); *H04L 1/1642* (2013.01); *H04L 5/0048* (2013.01); *H04W 72/0453* (2013.01)

(58) Field of Classification Search
None
See application file for complete search history.

(56) References Cited

U.S. PATENT DOCUMENTS 9,350,478 B2 *   5/2016   Shimezawa .......... H04J 11/0053
10,396,953 B2 *  8/2019   Sun ..................... H04L 27/2698
(Continued)

FOREIGN PATENT DOCUMENTS

CN    102111782 A    6/2011
CN    102804658 A    11/2012
(Continued)

OTHER PUBLICATIONS

"3rd Generation Partnership Project; Technical Specification Group Radio Access Network; NR; Physical channels and modulation (Release 15)," 3GPP TS 38.211 V15.1.0, total 90 pages, 3rd Generation Partnership Project, Valbonne, France (Mar. 2018).
(Continued)

*Primary Examiner* — Eunsook Choi
(74) *Attorney, Agent, or Firm* — Leydig, Voit & Mayer, Ltd.

(57) ABSTRACT

This application provides a resource management method and apparatus. A terminal determines at least one reference signal resource corresponding to each of at least two frequency domain resources, and selects at least two reference signal resources from a plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can simultaneously receive data sent by a network device by using reference signal resources corresponding to different
(Continued)

frequency domain resources, thereby improving communication efficiency.

15 Claims, 5 Drawing Sheets

(51) Int. Cl.
  *H04L 5/00* (2006.01)
  *H04W 72/0453* (2023.01)
  *H04W 72/53* (2023.01)

(56) References Cited

U.S. PATENT DOCUMENTS

| | | | |
|---|---|---|---|
| 10,785,080 B2* | 9/2020 | Islam | H04B 7/06966 |
| 10,845,460 B2* | 11/2020 | Inoue | G01S 3/808 |
| 11,272,387 B2* | 3/2022 | Schrammar | H04B 17/318 |
| 11,368,962 B2* | 6/2022 | Wang | H04W 72/541 |
| 11,398,889 B2* | 7/2022 | Manolakos | H04W 72/0453 |
| 11,552,762 B2* | 1/2023 | Liu | H04L 5/0037 |
| 2015/0139128 A1 | 5/2015 | Park et al. | |
| 2020/0067669 A1* | 2/2020 | Tang | H04B 7/0456 |
| 2020/0235899 A1* | 7/2020 | Gao | H04B 7/0626 |
| 2021/0184808 A1* | 6/2021 | Liu | H04L 5/0028 |

FOREIGN PATENT DOCUMENTS

| | | |
|---|---|---|
| CN | 103582141 A | 2/2014 |
| CN | 107404370 A | 11/2017 |
| CN | 107734663 A | 2/2018 |
| CN | 108282298 A | 7/2018 |
| EP | 3361798 A1 | 8/2018 |
| EP | 3687081 A1 | 7/2020 |
| WO | 2014019517 A1 | 2/2014 |
| WO | 2017061158 A1 | 4/2017 |
| WO | 2018082632 A1 | 5/2018 |
| WO | 2018141163 A1 | 8/2018 |

OTHER PUBLICATIONS

"3rd Generation Partnership Project; Technical Specification Group Radio Access Network; NR; Multiplexing and channel coding (Release 15)," 3GPP TS 38.212 V15.1.0, total 94 pages, 3rd Generation Partnership Project, Valbonne, France (Mar. 2018).

"3rd Generation Partnership Project; Technical Specification Group Radio Access Network; NR; Physical layer procedures for control (Release 15)," 3GPP TS 38.213 V15.1.0, total 77 pages, 3rd Generation Partnership Project, Valbonne, France (Mar. 2018).

"3rd Generation Partnership Project; Technical Specification Group Radio Access Network; NR; Physical layer procedures for data (Release 15)," 3GPP TS 38.214 V15.1.0, total 77 pages, 3rd Generation Partnership Project, Valbonne, France (Mar. 2018).

"3rd Generation Partnership Project; Technical Specification Group Radio Access Network; NR; Radio Resource Control (RRC) protocol specification (Release 15)," 3GPP TS 38.331 V15.1.0, total 268 pages, 3rd Generation Partnership Project, Valbonne, France (Mar. 2018).

* cited by examiner

RESOURCE MANAGEMENT METHOD AND APPARATUS

CROSS-REFERENCE TO RELATED APPLICATIONS

This application is a continuation of International Application No. PCT/CN2019/099102, filed on Aug. 2, 2019, which claims priority to Chinese Patent Application No. 201810923254.9, filed on Aug. 14, 2018. The disclosures of the aforementioned applications are hereby incorporated by reference in their entireties.

TECHNICAL FIELD

This application relates to the communications field, and more specifically, to a resource management method and apparatus.

BACKGROUND

A beam management process mainly includes four steps: A network device configures beam resources; a terminal measures beam communication quality; the terminal selects an optimal beam; and the terminal reports the optimal beam to the network device.

In a conventional solution, the terminal performs beam management on each bandwidth part (BWP), that is, selects an optimal beam for each BWP. Each BWP corresponds to a plurality of beams. The terminal uses, as an optimal beam based on beam communication quality of all beams, a beam that has best communication quality and that is used for communication with the network device, and reports the optimal beam to the network device. In this way, the network device can independently communicate with the terminal on the optimal beam corresponding to each BWP.

However, in the conventional solution, in a scenario in which the network device communicates with the terminal by using a plurality of BWPs and an optimal beam corresponding to each of the plurality of BWPs, the network device needs to communicate with the terminal on optimal beams corresponding to all BWPs in sequence. Consequently, communication efficiency is relatively low.

SUMMARY

This application provides a resource management method and apparatus, to help improve communication efficiency.

According to a first aspect, a resource management method is provided. The method includes: determining at least two reference signal resources in a plurality of reference signal resources corresponding to at least two frequency domain resources, where the at least two reference signal resources are reference signal resources on which a terminal can simultaneously receive reference signals sent by using the at least two reference signal resources, and the at least two reference signal resources are reference signal resources corresponding to the at least two frequency domain resources; and simultaneously receiving data sent on the at least two reference signal resources.

The terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can simultaneously receive data sent by a network device by using reference signal resources corresponding to different frequency domain resources, thereby improving communication efficiency.

In some possible implementations, the determining at least two reference signal resources in a plurality of reference signal resources corresponding to the at least two frequency domain resources includes: determining, as the at least two reference signal resources, reference signal resources that are in the plurality of reference signal resources, that correspond to different frequency domain resources, and on which reference signals are simultaneously received by using a preset receiving parameter.

A reference signal resource for determining that the terminal can simultaneously receive the reference signals is provided in this embodiment of this application, thereby improving communication efficiency.

In some possible implementations, before the simultaneously receiving data sent on the at least two reference signal resources, the method further includes:
sending first indication information, where the first indication information is used to indicate the at least two reference signal resources.

After selecting the reference signal resources, the terminal may report the selected reference signal resources to the network device by using the first indication information, and the network device can simultaneously send reference signals on the selected reference signal resources based on the first indication information, thereby improving communication efficiency.

In some possible implementations, the first indication information includes a number of each of the at least two reference signal resources, and the number of the reference signal resource is obtained by sequentially numbering all reference signal resources corresponding to the at least two frequency domain resources.

The network device may learn, based on the numbers of the at least two reference signal resources, of the at least two reference signal resources selected by the terminal, so that the network device can simultaneously send reference signals on the at least two selected reference signal resources, thereby improving communication efficiency.

In some possible implementations, the first indication information includes a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

The first indication information may include identifiers of all frequency domain resources and numbers of reference signal resources. The network device learns, based on the identifiers of the frequency domain resources and the numbers of the reference signal resources, of the at least two reference signal resources selected by the terminal, thereby improving communication efficiency.

In some possible implementations, before the plurality of reference signal resources corresponding to the at least two frequency domain resources are determined, the method further includes: receiving resource configuration information, where the resource configuration information is used to indicate at least one reference signal resource corresponding to each of the at least two frequency domain resources.

The terminal may learn, by using the resource configuration information sent by the network device, of the plurality of reference signal resources corresponding to the at least two frequency domain resources. In other words, the terminal may receive the reference signal resources flexibly configured by the network device, thereby improving flexibility of configuring the reference signal resources.

In some possible implementations, the resource configuration information includes at least one resource setting corresponding to each of the at least two frequency domain resources, each of the at least one resource setting includes a plurality of resource sets, and each of the plurality of resource sets includes at least one reference signal resource.

All reference signal resources in each resource setting correspond to one frequency domain resource, or different frequency domain resources correspond to different resource settings.

In some possible implementations, the resource configuration information includes a first resource set, and the first resource set includes at least one reference signal resource corresponding to each of the at least two frequency domain resources.

The plurality of reference signal resources corresponding to the at least two frequency domain resources belong to a same resource set, and different frequency domain resources may correspond to different reference signal resources.

In some possible implementations, the resource configuration information includes a first resource setting, the first resource setting includes a resource set corresponding to each of the at least two frequency domain resources, and the resource set includes at least one reference signal resource.

All resource sets corresponding to the at least two frequency domain resources belong to a same resource setting, and different frequency domain resources may correspond to different resource sets.

In some possible implementations, the method further includes:
  receiving second indication information, where the second indication information is used to indicate a maximum value of a quantity of reference signal resources configured for the terminal.

The determining at least two reference signal resources in a plurality of reference signal resources corresponding to the at least two frequency domain resources includes:
  determining the at least two reference signal resources based on the second indication information, where a quantity of the at least two reference signal resources is less than or equal to the maximum value.

The network device configures an allowed maximum value of a quantity of reference signal resources for the terminal. In this way, a quantity of reference signal resources on which reference signals can be simultaneously received and that are selected by the terminal from the plurality of reference signal resources corresponding to the at least two frequency domain resources is less than or equal to the maximum value. If the quantity of reference signal resources on which the reference signals can be simultaneously received and that are determined by the terminal is greater than the maximum value, some reference signal resources may be selected from the plurality of determined reference signals. To be specific, the some reference signal resources are discarded, and are not reported to the network device by using the indication information. If the quantity of reference signal resources on which the reference signals can be simultaneously received and that are determined by the terminal is less than the maximum value, a signaling format may be met by adding "0".

According to a second aspect, a resource management method is provided. The method includes: receiving first indication information, where the first indication information is used to indicate at least two reference signal resources, the at least two reference signal resources are determined by a terminal in a plurality of reference signal resources corresponding to at least two frequency domain resources, and the at least two reference signal resources are reference signal resources corresponding to the at least two frequency domain resources; and simultaneously sending data on the at least two reference signal resources.

The terminal selects the at least two reference signal resources from the plurality of reference signal resources corresponding to the at least two frequency domain resources, where some of the at least two reference signal resources are selected from a plurality of reference signal resources corresponding to one frequency domain resource, and other reference signal resources are selected from a plurality of reference signal resources corresponding to another frequency domain resource. The terminal indicates the at least two reference signal resources to a network device by using the first indication information. In this way, the network device can simultaneously send data on reference signal resources corresponding to different frequency domain resources, and the terminal can simultaneously receive the data, thereby improving communication efficiency.

In some possible implementations, before the receiving first indication information, the method further includes:
  sending resource configuration information, where the resource configuration information is used to indicate at least one reference signal resource corresponding to each of the at least two frequency domain resources.

The resource configuration information sent by the network device to the terminal may indicate the plurality of reference signal resources corresponding to the at least two frequency domain resources. In other words, the network device may flexibly configure the reference signal resources, thereby improving flexibility of configuring the reference signal resources.

In some possible implementations, the resource configuration information includes at least one resource setting corresponding to each of the at least two frequency domain resources, each of the at least one resource setting includes a plurality of resource sets, and each of the plurality of resource sets includes at least one reference signal resource.

All reference signal resources in each resource setting correspond to one frequency domain resource, or different frequency domain resources correspond to different resource settings.

In some possible implementations, the resource configuration information includes a first resource set, and the first resource set includes at least one reference signal resource corresponding to each of the at least two frequency domain resources.

The plurality of reference signal resources corresponding to the at least two frequency domain resources belong to a same resource set, and different frequency domain resources may correspond to different reference signal resources.

In some possible implementations, the resource configuration information includes a first resource setting, the first resource setting includes a resource set corresponding to each of the at least two frequency domain resources, and the resource set includes at least one reference signal resource.

All resource sets corresponding to the at least two frequency domain resources belong to a same resource setting, and different frequency domain resources may correspond to different resource sets.

In some possible implementations, the first indication information includes a number of each of the at least two reference signal resources, and the number of the reference signal resource is obtained by sequentially numbering all reference signal resources corresponding to the at least two frequency domain resources.

The network device may learn, based on the numbers of the at least two reference signal resources, of the at least two reference signal resources selected by the terminal, so that the network device can simultaneously send reference signals on the at least two selected reference signal resources, thereby improving communication efficiency.

In some possible implementations, the first indication information includes a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

The first indication information may include identifiers of all frequency domain resources and numbers of reference signal resources. The network device learns, based on the identifiers of the frequency domain resources and the numbers of the reference signal resources, of the at least two reference signal resources selected by the terminal, thereby improving communication efficiency.

In some possible implementations, the method further includes:
  sending second indication information, where the second indication information is used to indicate a maximum value of a quantity of reference signal resources configured for the terminal.

The network device configures an allowed maximum value of a quantity of reference signal resources for the terminal. In this way, a quantity of reference signal resources on which reference signals can be simultaneously received and that are selected by the terminal from the plurality of reference signal resources corresponding to the at least two frequency domain resources is less than or equal to the maximum value.

According to a third aspect, a resource management method is provided. The method includes: determining at least two reference signal resources in a plurality of reference signal resources corresponding to at least two frequency domain resources, where the at least two reference signal resources are reference signal resources on which a terminal can receive reference signals sent by using the at least two reference signal resources, and the at least two reference signal resources are reference signal resources corresponding to the at least two frequency domain resources; and receiving reference signals or data sent on the at least two reference signal resources.

The terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can receive reference signals sent by a network device by using reference signal resources corresponding to different frequency domain resources, so that the terminal implements receiving of the reference signals or data sent by the network device by using the reference signal resources corresponding to the different frequency domain resources, thereby improving flexibility of transmitting the reference signals or data.

In some possible implementations, that the at least two reference signal resources are reference signal resources on which a terminal can receive reference signals sent by using the at least two reference signal resources may be specifically: The at least two reference signal resources are the reference signal resources on which the terminal can simultaneously receive the reference signals sent by using the at least two reference signal resources.

Simultaneous receiving by the terminal may mean that the terminal is capable of receiving, at a same time point, signals sent by using a plurality of transmit beams. Receiving at a same time point may be receiving at a same moment, or receiving at an overlapping moment, or receiving in a same time unit, or receiving in least one overlapping time unit. The time unit may be one or more radio frames, one or more subframes, one or more slots, one or more mini slots, or one or more orthogonal frequency division multiplexing symbols defined in an LTE system or a 5G NR system, or may be a time window including a plurality of frames or subframes, for example, a system information window. The terminal can select the reference signal resources on which the reference signals sent by the network device by using the at least two reference signal resources can be simultaneously received, to help simultaneously receive reference signals sent by the network device by using reference signal resources corresponding to different frequency domain resources, thereby improving communication efficiency.

In some possible implementations, the receiving reference signals or data sent on the at least two reference signal resources may be specifically simultaneously receiving the reference signals or data sent on the at least two reference signal resources.

In this way, the terminal can simultaneously receive reference signals sent by the network device by using reference signal resources corresponding to different frequency domain resources, thereby improving communication efficiency.

In some possible implementations, the determining at least two reference signal resources in a plurality of reference signal resources corresponding to at least two frequency domain resources includes: determining, as the at least two reference signal resources, reference signal resources that are in the plurality of reference signal resources, that correspond to different frequency domain resources, and on which reference signals are simultaneously received by using a preset receiving parameter.

A reference signal resource for determining that the terminal can simultaneously receive the reference signals is provided in this embodiment of this application, thereby improving communication efficiency.

In some possible implementations, before the receiving reference signals or data sent on the at least two reference signal resources, the method further includes:
  sending first indication information, where the first indication information is used to indicate the at least two reference signal resources.

After selecting the reference signal resources, the terminal may report the selected reference signal resources to the network device by using the first indication information, and the network device can simultaneously send reference signals on the selected reference signal resources based on the first indication information, thereby improving communication efficiency.

In some possible implementations, the first indication information includes a number of each of the at least two reference signal resources, and the number of the reference signal resource is obtained by sequentially numbering all reference signal resources corresponding to the at least two frequency domain resources.

The network device may learn, based on the numbers of the at least two reference signal resources, of the at least two reference signal resources selected by the terminal, so that the network device can simultaneously send reference signals on the at least two selected reference signal resources, thereby improving communication efficiency.

In some possible implementations, the first indication information includes a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

The first indication information may include identifiers of all frequency domain resources and numbers of reference signal resources. The network device learns, based on the identifiers of the frequency domain resources and the numbers of the reference signal resources, of the at least two reference signal resources selected by the terminal, thereby improving communication efficiency.

In some possible implementations, the method further includes: simultaneously receiving the data sent on the at least two reference signal resources.

The terminal can simultaneously receive the data sent on the at least two reference signal resources, thereby improving efficiency of communication between the network device and the terminal.

In some possible implementations, before the plurality of reference signal resources corresponding to the at least two frequency domain resources are determined, the method further includes: receiving resource configuration information, where the resource configuration information is used to indicate at least one reference signal resource corresponding to each of the at least two frequency domain resources.

The terminal may learn, by using the resource configuration information sent by the network device, of the plurality of reference signal resources corresponding to the at least two frequency domain resources. In other words, the terminal may receive the reference signal resources flexibly configured by the network device, thereby improving flexibility of configuring the reference signal resources.

In some possible implementations, the resource configuration information includes at least one resource setting corresponding to each of the at least two frequency domain resources, each of the at least one resource setting includes a plurality of resource sets, and each of the plurality of resource sets includes at least one reference signal resource.

All reference signal resources in each resource setting correspond to one frequency domain resource, or different frequency domain resources correspond to different resource settings.

In some possible implementations, the resource configuration information includes a first resource set, and the first resource set includes at least one reference signal resource corresponding to each of the at least two frequency domain resources.

The plurality of reference signal resources corresponding to the at least two frequency domain resources belong to a same resource set, and different frequency domain resources may correspond to different reference signal resources.

In some possible implementations, the resource configuration information includes a first resource setting, the first resource setting includes a resource set corresponding to each of the at least two frequency domain resources, and the resource set includes at least one reference signal resource.

All resource sets corresponding to the at least two frequency domain resources belong to a same resource setting, and different frequency domain resources may correspond to different resource sets.

In some possible implementations, the method further includes:
receiving second indication information, where the second indication information is used to indicate a maximum value of a quantity of reference signal resources configured for the terminal.

The determining at least two reference signal resources in a plurality of reference signal resources corresponding to the at least two frequency domain resources includes:
determining the at least two reference signal resources based on the second indication information, where a quantity of the at least two reference signal resources is less than or equal to the maximum value.

The network device configures an allowed maximum value of a quantity of reference signal resources for the terminal. In this way, a quantity of reference signal resources on which reference signals can be simultaneously received and that are selected by the terminal from the plurality of reference signal resources corresponding to the at least two frequency domain resources is less than or equal to the maximum value. If the quantity of reference signal resources on which the reference signals can be simultaneously received and that are determined by the terminal is greater than the maximum value, some reference signal resources may be selected from the plurality of determined reference signals. To be specific, the some reference signal resources are discarded, and are not reported to the network device by using the indication information. If the quantity of reference signal resources on which the reference signals can be simultaneously received and that are determined by the terminal is less than the maximum value, a signaling format may be met by adding "0".

According to a fourth aspect, a resource management method is provided. The method includes: receiving first indication information, where the first indication information is used to indicate at least two reference signal resources, the at least two reference signal resources are determined by a terminal in a plurality of reference signal resources corresponding to at least two frequency domain resources, and the at least two reference signal resources are reference signal resources corresponding to the at least two frequency domain resources; and sending data or reference signals on the at least two reference signal resources.

The terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, a network device can send reference signals to the terminal by using reference signal resources corresponding to different frequency domain resources, so that the network device implements sending of the reference signals or data to the terminal by using the reference signal resources corresponding to the different frequency domain resources, thereby improving flexibility of transmitting the reference signals or data.

In some possible implementations, the sending data or reference signals on the at least two reference signal resources includes: simultaneously sending the data or reference signals on the at least two reference signal resources.

Simultaneous sending by the network device may mean that the network device is capable of sending signals by using a plurality of transmit beams at a same time point. Sending at a same time point may be sending at a same moment, or sending at an overlapping moment, or sending in a same time unit, or sending in least one overlapping time unit. The time unit may be one or more radio frames, one or more subframes, one or more slots, one or more mini slots, or one or more orthogonal frequency division multiplexing symbols defined in an LTE system or a 5G NR system, or may be a time window including a plurality of frames or subframes, for example, a system information window. In other words, the network device can simultaneously send data on reference signal resources corresponding to different frequency domain resources, and the terminal can simultaneously receive the data, thereby improving communication efficiency.

In some possible implementations, before the receiving first indication information, the method further includes:

sending resource configuration information, where the resource configuration information is used to indicate at least one reference signal resource corresponding to each of the at least two frequency domain resources.

The resource configuration information sent by the network device to the terminal may indicate the plurality of reference signal resources corresponding to the at least two frequency domain resources. In other words, the network device may flexibly configure the reference signal resources, thereby improving flexibility of configuring the reference signal resources.

In some possible implementations, the resource configuration information includes at least one resource setting corresponding to each of the at least two frequency domain resources, each of the at least one resource setting includes a plurality of resource sets, and each of the plurality of resource sets includes at least one reference signal resource.

All reference signal resources in each resource setting correspond to one frequency domain resource, or different frequency domain resources correspond to different resource settings.

In some possible implementations, the resource configuration information includes a first resource set, and the first resource set includes at least one reference signal resource corresponding to each of the at least two frequency domain resources.

The plurality of reference signal resources corresponding to the at least two frequency domain resources belong to a same resource set, and different frequency domain resources may correspond to different reference signal resources.

In some possible implementations, the resource configuration information includes a first resource setting, the first resource setting includes a resource set corresponding to each of the at least two frequency domain resources, and the resource set includes at least one reference signal resource.

All resource sets corresponding to the at least two frequency domain resources belong to a same resource setting, and different frequency domain resources may correspond to different resource sets.

In some possible implementations, the first indication information includes a number of each of the at least two reference signal resources, and the number of the reference signal resource is obtained by sequentially numbering all reference signal resources corresponding to the at least two frequency domain resources.

The network device may learn, based on the numbers of the at least two reference signal resources, of the at least two reference signal resources selected by the terminal, so that the network device can simultaneously send reference signals on the at least two selected reference signal resources, thereby improving communication efficiency.

In some possible implementations, the first indication information includes a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

The first indication information may include identifiers of all frequency domain resources and numbers of reference signal resources. The network device learns, based on the identifiers of the frequency domain resources and the numbers of the reference signal resources, of the at least two reference signal resources selected by the terminal, thereby improving communication efficiency.

In some possible implementations, the method further includes:

sending second indication information, where the second indication information is used to indicate a maximum value of a quantity of reference signal resources configured for the terminal.

The network device configures an allowed maximum value of a quantity of reference signal resources for the terminal. In this way, a quantity of reference signal resources on which reference signals can be simultaneously received and that are selected by the terminal from the plurality of reference signal resources corresponding to the at least two frequency domain resources is less than or equal to the maximum value.

According to a fifth aspect, a resource management apparatus is provided. The apparatus may be a terminal, or may be a chip in a terminal. The apparatus has functions of implementing the embodiments of the first aspect. The functions may be implemented by hardware, or may be implemented by hardware executing corresponding software. The hardware or the software includes one or more units corresponding to the foregoing functions.

In a possible design, when the apparatus is the terminal, the terminal includes a processing module and a transceiver module. The processing module may be, for example, a processor. The transceiver module may be, for example, a transceiver, and the transceiver includes a radio frequency circuit. Optionally, the terminal further includes a storage module, and the storage module may be, for example, a memory. The storage module may alternatively be a storage module that is in the terminal and that is located outside the chip, for example, a read-only memory (ROM), another type of static storage device that can store static information and an instruction, or a random access memory (RAM). When the terminal includes the storage module, the storage module is configured to store a computer executable instruction, the processing module is connected to the storage module, and the processing module executes the computer execution instruction stored in the storage module, so that the terminal performs the method according to any one of the first aspect or the implementations of the first aspect.

In another possible design, when the apparatus is the chip in the terminal, the chip includes a processing module and a transceiver module. The processing module may be, for example, a processor, and the transceiver module may be, for example, an input/output interface, a pin, or a circuit on the chip. The processing module can execute a computer execution instruction stored in a storage module, so that the chip in the terminal performs the method according to any one of the first aspect or the implementations of the first aspect. Optionally, the chip may further include the storage module. The storage module is a storage module in the chip, for example, a register or a cache.

The processor mentioned above may be a general-purpose central processing unit (CPU), a microprocessor, an application-specific integrated circuit (ASIC), or one or more integrated circuits configured to control program execution of the method in the first aspect.

According to a sixth aspect, a resource management apparatus is provided. The apparatus may be a network device, or may be a chip in a network device. The apparatus has functions of implementing the embodiments of the second aspect. The functions may be implemented by hardware, or may be implemented by hardware executing corresponding software. The hardware or the software includes one or more units corresponding to the foregoing functions.

In a possible design, when the apparatus is the network device, the network device includes a transceiver module. Optionally, the network device may further include a processing module. The processing module may be, for example, a processor. The transceiver module may be, for example, a transceiver, and the transceiver includes a radio frequency circuit. Optionally, the network device further includes a storage module, and the storage module may be, for example, a memory. The storage module may alternatively be a storage module that is in the network device and that is located outside the chip, for example, a read-only memory (ROM), another type of static storage device that can store static information and an instruction, or a random access memory (RAM). When the network device includes the storage module, the storage module is configured to store a computer execution instruction, the processing module is connected to the storage module, and the processing module executes the computer execution instruction stored in the storage module, so that the network device performs the method according to any one of the second aspect or the implementations of the second aspect.

In another possible design, when the apparatus is the chip in the network device, the chip includes a transceiver module. Optionally, the chip may further include a processing module. The processing module may be, for example, a processor, and the transceiver module may be, for example, an input/output interface, a pin, or a circuit on the chip. The processing module can execute a computer execution instruction stored in a storage module, so that the chip in the network device performs the method according to any one of the second aspect or the implementations of the second aspect. Optionally, the chip may further include the storage module. The storage module is a storage module in the chip, for example, a register or a cache.

The processor mentioned above may be a general-purpose central processing unit (CPU), a microprocessor, an application-specific integrated circuit (ASIC), or one or more integrated circuits configured to control program execution of the method in the second aspect.

According to a seventh aspect, a resource management apparatus is provided. The apparatus may be a terminal, or may be a chip in a terminal. The apparatus has functions of implementing the embodiments of the third aspect. The functions may be implemented by hardware, or may be implemented by hardware executing corresponding software. The hardware or the software includes one or more units corresponding to the foregoing functions.

In a possible design, when the apparatus is the terminal, the terminal includes a processing module and a transceiver module. The processing module may be, for example, a processor. The transceiver module may be, for example, a transceiver, and the transceiver includes a radio frequency circuit. Optionally, the terminal further includes a storage module, and the storage module may be, for example, a memory. The storage module may alternatively be a storage module that is in the terminal and that is located outside the chip, for example, a read-only memory (ROM), another type of static storage device that can store static information and an instruction, or a random access memory (RAM). When the terminal includes the storage module, the storage module is configured to store a computer execution instruction, the processing module is connected to the storage module, and the processing module executes the computer execution instruction stored in the storage module, so that the terminal performs the method according to any one of the third aspect or the implementations of the third aspect.

In another possible design, when the apparatus is the chip in the terminal, the chip includes a processing module and a transceiver module. The processing module may be, for example, a processor, and the transceiver module may be, for example, an input/output interface, a pin, or a circuit on the chip. The processing module can execute a computer execution instruction stored in a storage module, so that the chip in the terminal performs the method according to any one of the third aspect or the implementations of the third aspect. Optionally, the chip may further include the storage module. The storage module is a storage module in the chip, for example, a register or a cache.

The processor mentioned above may be a general-purpose central processing unit (CPU), a microprocessor, an application-specific integrated circuit (ASIC), or one or more integrated circuits configured to control program execution of the method in the third aspect.

According to an eighth aspect, a resource management apparatus is provided. The apparatus may be a network device, or may be a chip in a network device. The apparatus has functions of implementing the embodiments of the fourth aspect. The functions may be implemented by hardware, or may be implemented by hardware executing corresponding software. The hardware or the software includes one or more units corresponding to the foregoing functions.

In a possible design, when the apparatus is the network device, the network device includes a transceiver module. Optionally, the network device may further include a processing module. The processing module may be, for example, a processor. The transceiver module may be, for example, a transceiver, and the transceiver includes a radio frequency circuit. Optionally, the network device further includes a storage module, and the storage module may be, for example, a memory. The storage module may alternatively be a storage module that is in the network device and that is located outside the chip, for example, a read-only memory (ROM), another type of static storage device that can store static information and an instruction, or a random access memory (RAM). When the network device includes the storage module, the storage module is configured to store a computer execution instruction, the processing module is connected to the storage module, and the processing module executes the computer execution instruction stored in the storage module, so that the network device performs the method according to any one of the fourth aspect or the implementations of the fourth aspect.

In another possible design, when the apparatus is the chip in the network device, the chip includes a transceiver module. Optionally, the chip may further include a processing module. The processing module may be, for example, a processor, and the transceiver module may be, for example, an input/output interface, a pin, or a circuit on the chip. The processing module can execute a computer execution instruction stored in a storage module, so that the chip in the network device performs the method according to any one of the fourth aspect or the implementations of the fourth aspect. Optionally, the chip may further include the storage module. The storage module is a storage module in the chip, for example, a register or a cache.

The processor mentioned above may be a general-purpose central processing unit (CPU), a microprocessor, an application-specific integrated circuit (ASIC), or one or more integrated circuits configured to control program execution of the method in the fourth aspect.

According to a ninth aspect, a communications system is provided. The communications system includes the apparatus according to the fifth aspect and the apparatus according to the sixth aspect.

According to a tenth aspect, a communications system is provided. The communications system includes the apparatus according to the seventh aspect and the apparatus according to the eighth aspect.

According to an eleventh aspect, a computer storage medium is provided. The computer storage medium stores program code, and the program code is used to indicate an instruction for performing the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to a twelfth aspect, a processor is provided. The processor is configured to be coupled to a memory, and is configured to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

According to a thirteenth aspect, a computer program product including an instruction is provided. When the computer program product is run on a computer, the computer is enabled to perform the method according to any one of the first aspect or the possible implementations of the first aspect, the method according to any one of the second aspect or the possible implementations of the second aspect, the method according to any one of the third aspect or the possible implementations of the third aspect, or the method according to any one of the fourth aspect or the possible implementations of the fourth aspect.

Based on the foregoing technical solutions, the terminal determines at least one reference signal resource corresponding to each of at least two frequency domain resources, and selects at least two reference signal resources from a plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can simultaneously receive data sent by the network device by using reference signal resources corresponding to different frequency domain resources, thereby improving communication efficiency.

DESCRIPTION OF EMBODIMENTS

The following describes technical solutions in this application with reference to the accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

A terminal in the embodiments of this application may be user equipment, an access terminal, a subscriber unit, a subscriber station, a mobile station, a mobile console, a remote station, a remote terminal, a mobile device, a user terminal, a wireless communications device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, or a terminal in a future evolved public land mobile network (PLMN). This is not limited in the embodiments of this application.

A network device in the embodiments of this application may be a device configured to communicate with the terminal. The network device may be a base transceiver station (BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN, or the like. This is not limited in the embodiments of this application.

Figure 1:
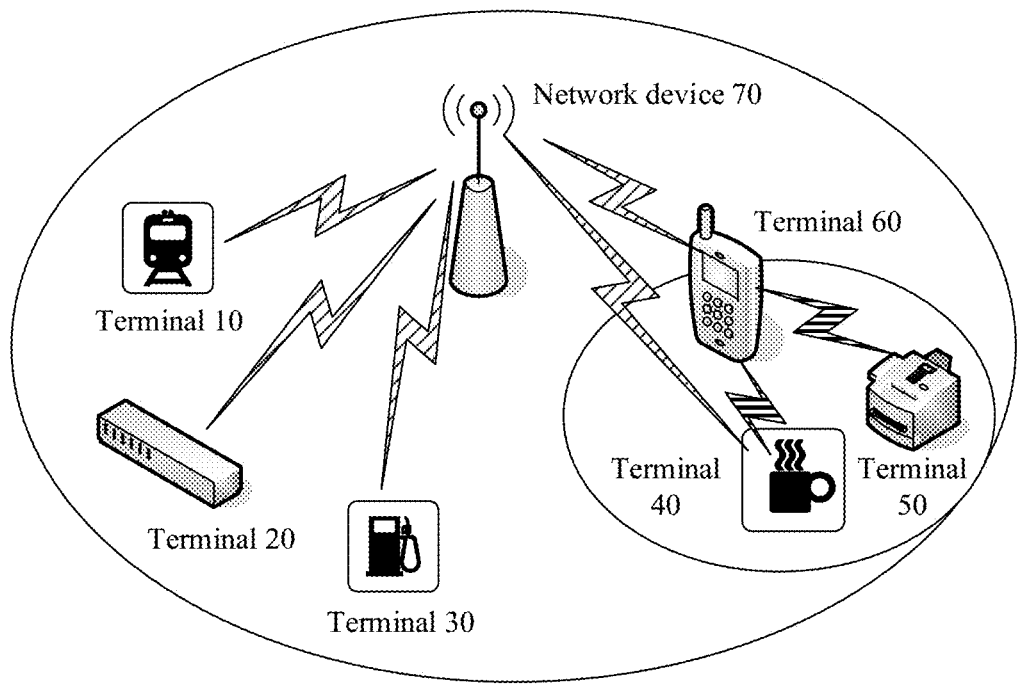
FIG. 1 is a schematic diagram of a communications system according to this application.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to: provide a communications service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communications system. The terminal 60 may send downlink signals to the terminal 40 and the terminal 50, or may receive uplink signals sent by the terminal 40 and the terminal 50.

To facilitate understanding of this application, the following describes terms related to this application.

Beam:

The beam is a communication resource, and different beams may be considered as different communication resources. Different beams may be used to send same information, or may be used to send different information. The beam may correspond to at least one of a time domain resource, a space resource, or a frequency domain resource.

Optionally, a plurality of beams having a same or a same type of communication feature may be considered as one beam, and one beam may include one or more antenna ports, configured to transmit a data channel, a control channel, a sounding signal, and the like. For example, a transmit beam may refer to signal strength distribution formed in different directions in space after a signal is transmitted through an antenna, and a receive beam may refer to signal strength distribution in different directions in space of a radio signal received from an antenna.

Specifically, the beam may be a wide beam, may be a narrow beam, or may be a beam of another type. A beam forming technology may be a beamforming technology or another technical means. This is not limited in this application. Through the beamforming technology, a higher antenna array gain may be implemented by sending or receiving a signal in a specific direction in space. In addition, beams may be classified into a transmit beam and a receive beam of the network device, and a transmit beam and a receive beam of the terminal. The transmit beam of the network device is used to describe beamforming information on a receive side of the network device, and the receive beam of the network device is used to describe beamforming information on a receive side of the network device. The transmit beam of the terminal is used to describe beamforming information on a transmit side of the terminal, and the receive beam of the terminal is used to describe beamforming information on a receive side.

More specifically, the beamforming technology includes a digital beamforming technology, an analog beamforming technology, and a hybrid digital analog beamforming technology. The analog beamforming technology may be implemented by using a radio frequency. For example, a phase of a radio frequency chain (RF chain) is adjusted by using a phase shifter, to control a change of an analog beam direction. Therefore, one RF chain can generate only one analog beam at a same moment. In addition, for communication based on the analog beam, a beam at a transmit end and a beam at a receive end need to be aligned. Otherwise, a signal cannot be normally transmitted.

It should be understood that one or more antenna ports forming one beam may also be considered as one antenna port set.

It should be further understood that the beam may be further represented by using a spatial filter (spatial filter) or a spatial domain transmission filter (spatial domain transmission filter). In other words, the beam may also be referred to as the "spatial filter". A transmit beam is referred to as a "spatial transmit filter", and a receive beam is referred to as a "spatial receive filter".

Beam Management Resource:

The beam management resource is a resource used for beam management, and may be specifically a resource used to calculate and measure beam quality. The beam quality may be represented by using at least one of a block error rate (BLER), reference signal received power (RSRP), reference signal received quality (RSRQ), a received signal strength indicator (RSSI), a signal to interference plus noise ratio (SINR), and a channel quality indicator (CQI).

The beam management resource may include a resource used to transmit a synchronization signal, a broadcast channel, a downlink channel measurement reference signal, a tracking signal, a downlink control channel demodulation reference signal, a downlink shared channel demodulation reference signal, an uplink sounding reference signal, or an uplink random access signal, and the resource may include a time-frequency resource and/or a beam.

Beam Indication Information:

The beam indication information is used to indicate a transmit beam and/or a receive beam used for signal transmission.

Specifically, the beam indication information includes at least one of a beam number, a beam management resource number, a resource number of an uplink signal, an absolute index of a beam, a relative index of a beam, a logical index of a beam, an index of an antenna port corresponding to a beam, an index of an antenna port group corresponding to a beam, an index of a downlink signal corresponding to a beam, a time index of a downlink synchronization signal block corresponding to a beam, beam pair link (BPL) information, a transmit parameter (Tx parameter) corresponding to a beam, a receive parameter (Rx parameter) corresponding to a beam, a transmit weight corresponding to a beam, a weight matrix corresponding to a beam, a weight vector corresponding to a beam, a receive weight corresponding to a beam, an index of a transmit weight corresponding to a beam, an index of a weight matrix corresponding to a beam, an index of a weight vector corresponding to a beam, an index of a receive weight corresponding to a beam, a receive codebook corresponding to a beam, a transmit codebook corresponding to a beam, an index of a receive codebook corresponding to a beam, and an index of a transmit codebook corresponding to a beam.

It should be understood that the downlink signal includes any one of a synchronization signal, a broadcast channel, a broadcast signal demodulation signal, a channel state information reference signal (CSI-RS), a cell specific reference signal (CS-RS), a UE specific reference signal (US-RS), a downlink control channel demodulation reference signal, a downlink data channel demodulation reference signal, and a downlink phase noise tracking signal. The uplink signal includes any one of an uplink random access sequence, an uplink sounding reference signal, an uplink control channel demodulation reference signal, an uplink data channel demodulation reference signal, and an uplink phase noise tracking signal.

Optionally, the beam indication information may alternatively be a transmission configuration index (TCI). The TCI may include a plurality of parameters, for example, a cell number, a bandwidth part number, a reference signal identifier, a synchronization signal block identifier, and a quasi-co-location (QCL) type.

It should be noted that different QCL types indicate different QCL identifiers, and the QCL identifiers are allocated by the network device to beams that are in beams associated with a frequency resource group and that have a QCL relationship.

Quasi-Co-Location:

A quasi-co-location relationship is used to indicate that a plurality of resources have one or more same or similar communication features. For the plurality of resources that have the quasi-co-location relationship, a same or similar communication configuration may be used. For example, if two antenna ports have a quasi-co-location relationship, a large-scale property of transmitting a signal on a symbol through one port may be inferred from a large-scale property of transmitting a channel on a symbol through the other port.

It should be noted that the large-scale property may include a delay spread, an average spread, a Doppler spread, a Doppler frequency shift, an average gain, a receive parameter, a receive beam number of the terminal device, a correlation between a transmit channel and a receive channel, a receive angle of arrival, a spatial correlation of a receiver antenna, a dominant angle of arrival (angle-of-arrival, AoA), an average angle of arrival, an AoA spread, and the like.

Spatial QCL:

The spatial QCL may be considered as a type of QCL. Spatial is understood from the perspective of a transmit end or a receive end. From the perspective of the transmit end, if two antenna ports are of spatial quasi-co-location, it indicates that beam directions of the two antenna ports are the same in space. From the perspective of the receive end, if two antenna ports are of spatial quasi-co-location, it indicates that the receive end can receive, in a same beam direction, signals sent on the two antenna ports.

Quasi-Co-Location Assumption (QCL Assumption):

The quasi-co-location assumption means: It is assumed that there is a QCL relationship between two ports. A configuration and an indication of the quasi-co-location assumption may be used to help a receive end receive and demodulate a signal. For example, the receive end can determine that there is a QCL relationship between a port A and a port B. In other words, a large-scale parameter of a signal measured on the port A may be used for signal measurement and demodulation on the port B.

Carrier Component (CC) and Carrier Aggregation (CA):

The CA can be used to combine a plurality of CCs to increase an available bandwidth and achieve a better transmission rate. Frequency domain resources included in the CA may be intra-band contiguous resources, intra-band non-contiguous resources, inter-band non-contiguous resources, or the like.

It should be noted that in the CA, a PDCCH and a PDSCH are allowed to be in a same CC or different CCs. In other words, cross-carrier scheduling is allowed.

Bandwidth:

The bandwidth may be understood as a segment of contiguous or non-contiguous resources in frequency domain. For example, the bandwidth may be a cell, a carrier, or a bandwidth part. The cell may be a serving cell of the terminal. The serving cell is described by a higher layer from the perspective of resource management, mobility management, or a service unit. A coverage area of each network device may be divided into one or more serving cells, and the serving cell may be considered as including a specific frequency domain resource. In other words, one serving cell may include one or more carriers. A carrier concept is described from the perspective of signal generation at a physical layer. One carrier is defined by one or more frequencies, corresponds to a segment of contiguous or non-contiguous spectrums, and is used to carry communication data between the network device and the terminal. A downlink carrier may be used for downlink transmission, and an uplink carrier may be used for uplink transmission. In addition, one carrier may include one or more bandwidth parts.

It should be noted that if one cell includes one carrier, one carrier may be considered as one independent cell without considering a physical location. In other words, the carrier and the cell may be equivalently replaced with each other.

It should be understood that the bandwidth part (BWP) may be referred to as a carrier bandwidth part, a subband bandwidth, a narrowband bandwidth, or the like. For ease of description, the BWP is used as an example for description in the following embodiments. However, this is not limited in this application.

A beam management process mainly includes four steps: The network device configures beam resources; the terminal measures beam communication quality; the terminal selects an optimal beam; and the terminal reports the optimal beam to the network device. In a conventional solution, the terminal performs beam management on each BWP, that is, selects an optimal beam for each BWP. Each BWP corresponds to a plurality of beams. The terminal uses, as an optimal beam based on beam communication quality of all beams, a beam that has best communication quality and that is used for communication with the network device, and reports the optimal beam to the network device. In this way, the network device can communicate with the terminal on the optimal beam corresponding to each BWP. However, in a conventional solution, communication efficiency of communicating with the terminal by the network device by using a BWP and an optimal beam corresponding to the BWP is relatively low.

For example, because beam management is independently performed on each BWP, beams selected for a plurality of BWPs may not be simultaneously received by the terminal. In this case, the network device can schedule different BWPs only at different time points to communicate with the terminal, or the network device schedules a plurality of BWPs at a same time point to communicate with the terminal, and the terminal can process data of all BWPs only in a specific priority sequence, and even data of some BWPs with lower priorities may be discarded.

Figure 2:
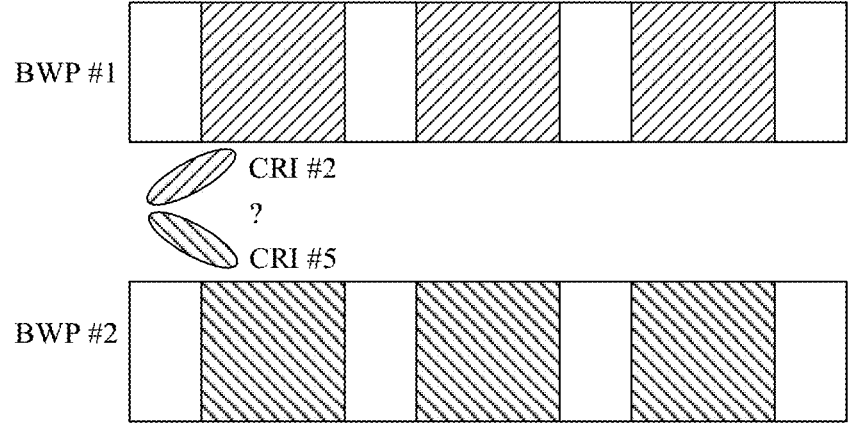
FIG. 2 is a schematic diagram of a signal transmission method in a conventional solution.

Specifically, as shown in FIG. 2, a beam selected for beam management of a BWP #1 is a CSI-RS resource indicator (CRI) #2, and a beam selected for beam management of a BWP #2 is a CRI #5. If a beam conflict occurs when the terminal receives signals sent by using transmit beams corresponding to the CRI #2 and the CRI #5, the terminal cannot simultaneously receive the signals sent by using the transmit beams corresponding to the CRI #2 and the CRI #5, thereby resulting in relatively low transmission efficiency.

Figure 3:
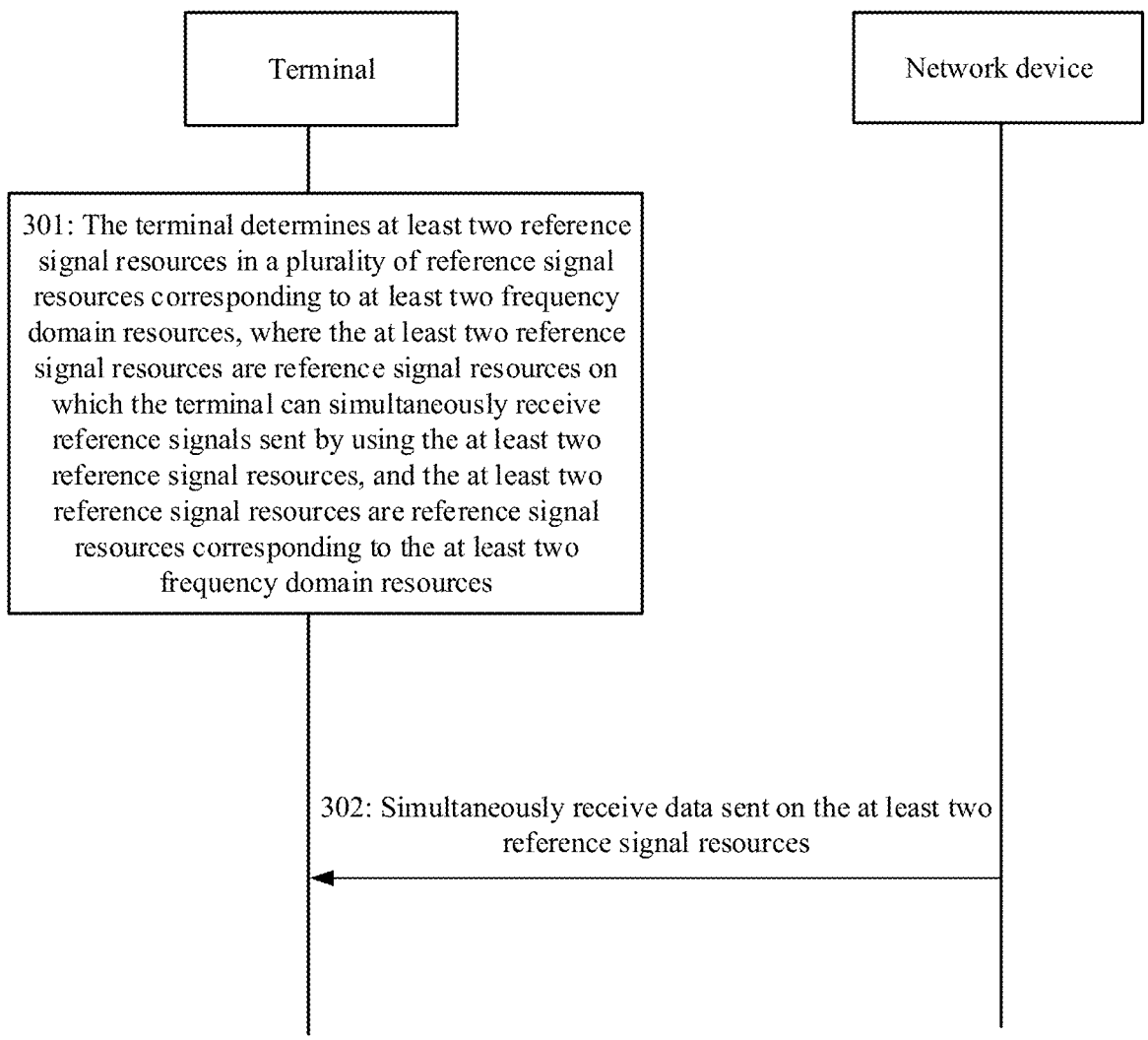
FIG. 3 is a schematic flowchart of a resource management method according to an embodiment of this application.

FIG. 3 is a schematic flowchart of a resource management method according to an embodiment of this application.

301: Determine at least two reference signal resources in a plurality of reference signal resources corresponding to at least two frequency domain resources, where the at least two reference signal resources are reference signal resources on which a terminal can simultaneously receive reference signals sent by using the at least two reference signal resources, and the at least two reference signal resources are reference signal resources corresponding to the at least two frequency domain resources.

Specifically, each of the at least two frequency domain resources may correspond to one or more reference signal resources. Different frequency domain resources may correspond to different quantities of reference signal resources, and reference signal resources corresponding to different frequency domain resources may be partially the same. The terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can simultaneously receive reference signals sent by a network device by using reference signal resources corresponding to different frequency domain resources, thereby improving communication efficiency.

It should be noted that each of the at least two reference signal resources may correspond to one frequency domain resource. Alternatively, when a quantity of the at least two reference signal resources is greater than 2, two reference signal resources may correspond to one frequency domain resource. This is not limited in this application.

For example, a first frequency domain resource corresponds to three reference signal resources, a second frequency domain resource corresponds to two reference signal resources, and a third frequency domain resource corresponds to two reference signal resources. The terminal may select two reference signal resources from the seven reference signal resources corresponding to the three frequency domain resources. The two selected reference signal resources are respectively selected from reference signal resources corresponding to two of the three frequency domain resources. Alternatively, the terminal may select three reference signal resources from the seven reference signal resources corresponding to the three frequency domain resources. The three selected reference signal resources may be respectively selected from reference signal resources corresponding to the three frequency domain resources, or two reference signal resources may be selected from three reference signal resources corresponding to a frequency domain resource (for example, the first frequency domain resource), and the other may be selected from reference signal resources corresponding to another frequency domain resource (for example, the second frequency domain resource).

It should be further noted that the embodiment shown in FIG. 3 may be performed by the terminal or the network device. When the embodiment shown in FIG. 3 is performed by the terminal, the reference signal resource indicates a transmit beam of the network device. When the embodiment shown in FIG. 3 is performed by the network device, the reference signal resource indicates a transmit beam of the terminal. For ease of description, an example in which the embodiment shown in FIG. 3 is performed by the terminal is used below for description. However, this application is not limited thereto.

It should be understood that the "reference signal resource" in this embodiment of this application may be the "transmit beam" described above. The two terms are not distinguished in the following embodiments.

It should be further understood that the frequency domain resource in this embodiment of this application may be the "bandwidth" described above, and when the frequency domain resource is a "BWP", different "BWPs" may belong to a same CC or different CCs. The following embodiment is described by using an example in which the frequency domain resource is the "BWP" and the different "BWPs" belong to the same CC. However, this application is not limited thereto. It should be noted that the different BWPs may be distinguished only by using different BWP identifiers (for example, a BWP index (index) #1 and a BWP index #2), or the different CCs are distinguished by using different CC identifiers (for example, a CC #1 and a CC #2). If BWP indexes in all CCs are the same, the different BWPs may also be distinguished by using identifiers of CCs to which the BWPs belong and identifiers of the BWPs (for example, a CC index #0 and a BWP index #1, and a CC index #1 and a BWP index #1).

It should be further understood that in this embodiment of this application, simultaneous receiving by the terminal may mean that the terminal is capable of receiving, at a same time point, signals sent by using a plurality of transmit beams. Receiving at a same time point may be receiving at a same moment, or receiving at an overlapping moment, or receiving in a same time unit, or receiving in least one overlapping time unit. The time unit may be one or more radio frames, one or more subframes, one or more slots, one or more mini slots, or one or more orthogonal frequency division multiplexing (OFDM) symbols defined in an LTE system or a 5G NR system, or may be a time window including a plurality of frames or subframes, for example, a system information (SI) window. The following embodiment is described by using an example in which the reference signals that are simultaneously received are reference signals received on one or more OFDM symbols. This is not limited in this application.

Optionally, the terminal determines, based on signals received in a same time unit, reference signal resources on which signals can be simultaneously received, or the terminal determines, based on signals received in different time units, reference signal resources on which signals can be simultaneously received.

Specifically, the terminal may separately perform measurement in a time unit 1, a time unit 2, a time unit 3, and a time unit 4, and finally select, based on an actual capability of the terminal, two transmit beams on which the terminal considers that the terminal can "simultaneously receive" signals.

Optionally, the terminal may receive resource configuration information, where the resource configuration information is used to indicate at least one reference signal resource corresponding to each of the at least two frequency domain resources. Correspondingly, the network device sends the resource configuration information.

Specifically, the terminal may learn, by using the resource configuration information sent by the network device, of the plurality of reference signal resources corresponding to the at least two frequency domain resources. In other words, the terminal may receive the reference signal resources flexibly configured by the network device, thereby improving flexibility of configuring the reference signal resources.

It should be noted that the resource configuration information may alternatively be agreed on by the terminal and the network device in advance. This is not limited in this application.

It should be understood that the resource configuration information may include only one or more reference signal resources corresponding to each of the at least two frequency domain resources. Alternatively, in addition to the reference signal resources corresponding to the at least two frequency domain resources, the resource configuration information further includes a reference signal resource corresponding to another frequency domain resource, other corresponding information, or the like. This is not limited in this application.

Optionally, the resource configuration information may include at least one resource setting corresponding to each of the at least two frequency domain resources, one resource setting includes a plurality of resource sets, and one resource set includes at least one reference signal resource.

Specifically, the resource configuration information sent by the network device includes at least one resource setting corresponding to each frequency domain resource. In other words, all reference signal resources in each resource setting correspond to one frequency domain resource, or different frequency domain resources correspond to different resource settings.

It should be noted that in addition to the plurality of resource sets including the reference signal resources, the resource setting may further include at least one of a non-zero-power CSI-RS resource set, a synchronization signal block (SS/PBCH block, SSB) resource set, and an interference measurement resource set. In addition, the resource setting may further include an identifier of a BWP and a type of a time domain resource (for example, a periodic type, a semi-persistent type, or an aperiodic type). In addition to the reference signal resource, the resource set may further include an identifier of the resource set, a time domain resource of the reference signal resource in the resource set, and the like.

For example, the first frequency domain resource corresponds to a resource setting #1, and the second frequency domain resource corresponds to a resource setting #2. The resource setting #1 may include a resource set #1 and a resource set #2, the resource set #1 includes a reference signal resource #5 and a reference signal resource #6, and the resource set #2 includes a reference signal resource #3 and a reference signal resource #4. The resource setting #2 may include a resource set #1 and a resource set #2, the resource set #1 includes a reference signal resource #1 and a reference signal resource #2, and the resource set #2 includes a reference signal resource #7 and a reference signal resource #8.

It should be noted that only one of the plurality of resource sets in the one resource setting may be in an active state (namely, an active resource set). In this case, the one or more reference signal resources corresponding to each frequency domain resource in this embodiment of this application can only be reference signal resources in an active resource set in each resource setting.

Optionally, each of the at least two frequency domain resources may be represented by using a frequency domain resource identifier. In other words, the resource configuration information includes a plurality of pairs of frequency domain resource identifiers and resource settings, or a frequency domain resource identifier is carried in a resource setting.

An example in which there are two frequency domain resources is used for description. The first frequency domain resource may be identified by using a CC index #0 and a BWP index #1, and the second frequency domain resource may be identified by using a CC index #1 and a BWP index #2. The resource setting #1 carries the CC index #0 and the BWP index #1, and the resource setting #2 carries the CC index #1 and the BWP index #2.

Optionally, the resource configuration information may include a first resource set, and the first resource set includes at least one reference signal resource corresponding to each of the at least two frequency domain resources.

Specifically, the first resource set may include at least one reference signal resource corresponding to each of the at least two frequency domain resources. In other words, the plurality of reference signal resources corresponding to the at least two frequency domain resources belong to a same resource set, and different frequency domain resources may correspond to different reference signal resources.

It should be noted that the resource configuration information may directly include the first resource set. Alternatively, the resource configuration information may include at least one resource setting, a first resource setting in the at least one resource setting includes at least one resource set, and the first resource set is a resource set in the at least one resource set. In this case, corresponding frequency domain resources do not need to be distinguished in the resource setting, or the resource setting does not need to include a frequency domain resource identifier.

It should be understood that the resource configuration information may further include another resource set. This is not limited in this application.

Optionally, each of the at least two frequency domain resources may be represented by using a frequency domain resource identifier. For example, the resource set #1 includes a reference signal resource #5 corresponding to a CC index

0 and a BWP index #1, a reference signal resource #6 corresponding to the CC index #0 and the BWP index #1, a reference signal resource #5 corresponding to a CC index #1 and a BWP index #2, and a reference signal resource #6 corresponding to the CC index #1 and the BWP index #2.

Optionally, the resource configuration information may include a first resource setting, the first resource setting includes a resource set corresponding to each of the at least two frequency domain resources, and the resource set includes at least one reference signal resource.

Specifically, the resource configuration information includes one resource setting (for example, the first resource setting), and the first resource setting includes a resource set corresponding to each of the at least two frequency domain resources. In other words, all resource sets corresponding to the at least two frequency domain resources belong to a same resource setting, and different frequency domain resources may correspond to different resource sets.

For example, the first frequency domain resource corresponds to a resource set #1, and the second frequency domain resource corresponds to a resource set #2. The resource set #1 includes a reference signal resource #5 and a reference signal resource #6, and the resource set #2 includes a reference signal resource #1 and a reference signal resource #2.

It should be noted that the resource configuration information may further include another resource setting. In other words, the resource configuration information includes a plurality of resource settings, and the first resource setting is one of the plurality of resource settings.

Optionally, each of the at least two frequency domain resources may be represented by using a frequency domain resource identifier. For example, the resource setting #1 includes a resource set #1 corresponding to a CC index #0 and a BWP index #1 and a resource set #2 corresponding to a CC index #1 and a BWP index #2.

Optionally, that the terminal determines the at least two reference signal resources may be: first determining a first target reference signal resource in a plurality of reference signal resources corresponding to a first frequency domain resource, and then determining a second target reference signal resource in a plurality of reference signal resources corresponding to a second frequency domain resource, where the second target reference signal resource is a reference signal resource that can be used together with the first target reference signal resource to simultaneously send reference signals, and the first target reference signal resource and the second target reference signal resource are used as selected reference signal resources. In this way, the terminal can simultaneously receive reference signals on the first target reference signal resource and the second target reference signal resource, thereby improving communication efficiency.

It should be noted that if the at least two reference signal resources are a plurality of reference signal resources, a third target reference signal resource may be a reference signal resource that can be used together with the first target reference signal resource and the second target reference signal resource to simultaneously receive reference signals.

Optionally, the terminal determines the at least two reference signal resources in the plurality of reference signal resources based on communication quality of the reference signal resources.

Specifically, the terminal may detect the communication quality of the reference signal resources, and select the at least two reference signal resources based on the communication quality of the reference signal resources. In this way, the terminal can simultaneously receive reference signals on two reference signal resources with relatively high communication quality, thereby improving communication efficiency while ensuring communication quality.

For example, the reference signal resources with relatively high communication quality that are obtained by the terminal through detection include a reference signal resource #1, a reference signal resource #2, a reference signal resource #5, and a reference signal resource #6. The reference signal resource #5 and the reference signal resource #2 have optimal communication quality. The terminal cannot simultaneously receive reference signals by using the two reference signal resources, but can simultaneously receive reference signals by using the reference signal resource #1 and the reference signal resource #5. Therefore, the terminal uses the reference signal resource #1 and the reference signal resource #5 as selected reference signal resources.

Optionally, that the terminal selects the at least two reference signal resources from the plurality of reference signal resources corresponding to the at least two frequency domain resources may be specifically: simultaneously receiving reference signals by using a preset receiving parameter, and determining, as the at least two reference signal resources, reference signal resources that are in the plurality of reference signal resources, that correspond to different frequency domain resources, and on which the reference signals are simultaneously received by using the preset receiving parameter.

Specifically, the terminal can simultaneously receive reference signals by using a preset receiving parameter, to measure reference signal resources on which the reference signals can be simultaneously received, and determine the reference signal resources on which the reference signals can be simultaneously received as the at least two reference signal resources. In this way, the reference signal resources on which the reference signals can be simultaneously received can be accurately determined through pre-measurement, thereby further improving communication efficiency.

Optionally, the preset receiving parameter is a preset receive beam. To be specific, the terminal can simultaneously receive, on a same receive beam, signals sent from two different transmit beams. For example, the two different transmit beams are close in a spatial direction, for example, do not exceed a specific angle (for example, 3 degrees).

Optionally, when the terminal is capable of simultaneously receiving signals in a plurality of directions, the plurality of beams may have specific isolation in a spatial direction. To be specific, the terminal can simultaneously receive, by using a plurality of receive beams, signals sent from two different transmit beams, and interference between signals received by using each receive beam is relatively small.

Optionally, after simultaneously receiving the reference signals by using the preset receiving parameter, to obtain, through measurement, the reference signal resources on which the reference signals can be simultaneously received, the terminal may further determine the at least two reference signal resources based on communication quality of the reference signal resources on which the reference signals can be simultaneously received.

Specifically, the terminal may determine the at least two reference signal resources based on a value relationship between a preset communication quality threshold and communication quality of a plurality of reference signal resources that is determined by using a preset receiving parameter.

It should be noted that determining the value relationship between the preset communication quality threshold and the communication quality of the plurality of reference signal resources that is determined by using the preset receiving parameter may be determining a value relationship between the preset communication quality threshold and communication quality of each of the plurality of reference signal resources that is determined by using the preset receiving parameter, may be determining a value relationship between the preset communication quality threshold and communication quality of some of the plurality of reference signal resources that is determined by using the preset receiving parameter, or may be determining a value relationship between the preset communication quality threshold and an average value of communication quality of some of the plurality of reference signal resources that is determined by using the preset receiving parameter. This is not limited in this application.

Optionally, when the reference signal resources on which the reference signals can be simultaneously received are a plurality of combinations, the terminal may further select an optimal combination based on a quantity of frequency domain resources corresponding to reference signal resources included in each combination. For example, if the first combination includes reference signal resources corresponding to two frequency domain resources, and the second combination includes reference signal resources corresponding to three frequency domain resources, the terminal may select the second combination.

Optionally, after simultaneously receiving the reference signals by using the preset receiving parameter, to obtain, through measurement, the reference signal resources on which the reference signals can be simultaneously received, the terminal may further determine the at least two reference signal resources based on communication power or communication stability of the reference signal resources on which the reference signals can be simultaneously received. For example, the terminal determines the at least two reference signal resources based on a value relationship between a preset power threshold and the communication power of the reference signal resources on which the reference signals can be simultaneously received.

Optionally, after simultaneously receiving the reference signals by using the preset receiving parameter, to obtain, through measurement, the reference signal resources on which the reference signals can be simultaneously received, the terminal may further determine the at least two reference signal resources based on at least one of communication quality, communication power, and communication stability of the reference signal resources on which the reference signals can be simultaneously received. For example, the terminal determines the at least two reference signal resources based on a value relationship between a preset power threshold and the communication power of the reference signal resources on which the reference signals can be simultaneously received. Alternatively, the terminal determines the at least two reference signal resources based on a value relationship between a preset stability threshold and the communication stability of the reference signal resources on which the reference signals can be simultaneously received.

Optionally, after simultaneously receiving the reference signals by using the preset receiving parameter, to obtain, through measurement, the reference signal resources on which the reference signals can be simultaneously received, the terminal may further determine the at least two reference signal resources based on angles of arrival of the reference signal resources on which the reference signals can be simultaneously received. For example, the terminal determines two reference signal resources with a smallest angle difference of arrival as the at least two reference signal resources, or determines at least two reference signal resources whose angle difference of arrival is greater than a preset angle threshold as the at least two reference signal resources.

Optionally, after determining the at least two reference signal resources, the terminal sends first indication information to the network device, where the first indication information is used to indicate the at least two reference signal resources. Correspondingly, the network device receives the first indication information.

Specifically, after selecting the reference signal resources, the terminal may report the selected reference signal resources to the network device by using the first indication information, and the network device can simultaneously send reference signals on the selected reference signal resources based on the first indication information, thereby improving communication efficiency.

It should be noted that the first indication information may further include at least one of a channel resource, a time-frequency domain resource, a scrambling code sequence, and power. This is not limited in this application. The channel resource may include a used physical uplink control channel (PUCCH) or a used physical uplink shared channel (PUSCH), the time domain resource may include a period and/or a time domain offset, and the frequency domain resource may include a start physical resource block (PRB) and a length.

Optionally, all reference signal resources corresponding to the at least two frequency domain resources may be sequentially numbered. In this way, the first indication information may include numbers of the at least two reference signal resources. The network device may learn, based on the numbers of the at least two reference signal resources, of the at least two reference signal resources selected by the terminal, so that the network device can simultaneously send reference signals on the at least two selected reference signal resources, thereby improving communication efficiency.

Specifically, the terminal device may sequentially number, randomly or according to a specific rule, all reference signal resources corresponding to the at least two frequency domain resources. Provided that the terminal and the network device agree on the sequential numbers, the network device can determine, based on the first indication information, which reference signal resources are indicated by the first indication information.

It should be understood that the sequential numbers may be in ascending order or in descending order. This is not limited in this application.

It should be further understood that the sequential number may also be referred to as a "reference signal resource index". This is not limited in this application.

Optionally, numbers of all reference signal resources corresponding to the at least two frequency domain resources may be represented by using at least one bit.

Specifically, a quantity of bits that need to be occupied by a quantity of all the reference signal resources corresponding to the at least two frequency domain resources is $\log_2$ (the quantity of all the reference signal resources corresponding to the at least two frequency domain resources) that is rounded up. For example, if all the reference signal resources corresponding to the at least two frequency domain resources are four reference signal resources, the four reference signal resources may be respectively represented by using different values of $\log_2 4=2$ bits (10, 11, 00, and 01).

Optionally, all reference signal resources corresponding to each of the at least two frequency domain resources may be sequentially numbered. In this way, the first indication information may include identifiers of all frequency domain resources and numbers of reference signal resources. The network device learns, based on the identifiers of the frequency domain resources and the numbers of the reference signal resources, of the at least two reference signal resources selected by the terminal.

It should be understood that reference signal resources corresponding to different frequency domain resources may have a same number or different numbers. This is not limited in this application.

Optionally, numbers of all reference signal resources corresponding to each of the at least two frequency domain resources may be represented by using at least one bit.

Specifically, a quantity of bits that need to be occupied by a quantity of reference signal resources corresponding to a first frequency domain resource in the at least two frequency domain resources is $\log_2$ (the quantity of reference signal resources corresponding to the first frequency domain resource) that is rounded up, and the first frequency domain resource may be any one of the at least two frequency domain resources. In other words, all the reference signal resources corresponding to each of the at least two frequency domain resources may be numbered in the foregoing manner.

Optionally, the identifier of the frequency domain resource may be a frequency domain resource index, and the frequency domain resource index may also be represented by using at least one bit.

For example, when different BWPs may be distinguished only by using different BWP indexes, a quantity of bits required by the BWP indexes is $\log_2$ (a quantity of the at least two frequency domain resources). When BWP indexes in all CCs are the same, and different BWPs are distinguished by using an index of a CC to which a BWP belongs and a BWP index, a quantity of bits occupied by the CC index is $\log_2$ (a quantity of CCs to which the at least two frequency domain resources belong), and a quantity of bits occupied by the BWP index is $\log_2$ (a quantity of frequency domain resources included in each CC).

Optionally, when frequency domain resources are different, and resource settings corresponding to the frequency domain resources are also different, the resource setting may be used to indicate the frequency domain resource. In this way, the identifier that is of the frequency domain resource and that is in the first indication information may be an identifier of the resource setting.

Optionally, when frequency domain resources are different, and resource sets corresponding to the frequency domain resources are also different, the resource set may be used to indicate the frequency domain resource. In this way, the identifier that is of the frequency domain resource and that is in the first indication information may be an identifier of the resource set.

Optionally, before determining the at least two reference signal resources, the terminal may receive second indication information sent by the network device, where the second indication information is used to indicate a maximum value of a quantity of reference signal resources configured for the terminal. Correspondingly, the network device sends the second indication information.

Specifically, the network device configures an allowed maximum value of a quantity of reference signal resources for the terminal. In this way, a quantity of reference signal resources on which reference signals can be simultaneously received and that are selected by the terminal from the plurality of reference signal resources corresponding to the at least two frequency domain resources is less than or equal to the maximum value. If the quantity of reference signal resources on which the reference signals can be simultaneously received and that are determined by the terminal is greater than the maximum value, some reference signal resources may be selected from the plurality of determined reference signals. To be specific, the some reference signal resources are discarded, and are not reported to the network device by using the indication information. If the quantity of reference signal resources on which the reference signals can be simultaneously received and that are determined by the terminal is less than the maximum value, a signaling format may be met by adding "0".

It should be noted that when the quantity of reference signal resources on which the reference signals can be simultaneously received and that are determined by the terminal is greater than the maximum value, the terminal may also update a capability of the reference signal resource, namely, the quantity of reference signal resources on which the reference signals can be simultaneously received.

Optionally, when the quantity of reference signal resources on which the reference signals can be simultaneously received and that are determined by the terminal is greater than the maximum value, some reference signal resources that need to be discarded may be selected based on communication quality of the reference signal resources or priorities of frequency domain resources corresponding to the reference signal resources. For example, a reference signal resource with low communication quality or a low priority of a frequency domain resource corresponding to the reference signal resource is discarded.

Optionally, the terminal may further receive configuration information used to indicate a reference signal resource selection criterion. The reference signal resource selection criterion is a first reference signal resource selection criterion or a second reference signal resource selection criterion. The terminal selects a reference signal resource according to the received reference signal resource selection criterion.

Specifically, the first reference signal resource selection criterion is to select at least two reference signal resources from a plurality of reference signal resources on which the terminal can simultaneously receive reference signals in this embodiment of this application, and the second reference signal resource selection criterion is to select a reference signal resource with high communication quality from any plurality of reference signal resources in a conventional solution. In this embodiment of this application, the network device may further send the configuration information to the terminal to indicate the reference signal resource selection criterion used by the terminal, so that the terminal can select the reference signal resource according to the reference signal resource selection criterion, thereby improving flexibility of selecting the reference signal resource.

302: The terminal simultaneously receives data sent by using the at least two reference signal resources. Correspondingly, the network device may send the data by using the at least two reference signal resources.

Specifically, the terminal may also simultaneously receive reference signals sent by using the at least two reference signal resources. Correspondingly, the network device may also send the reference signals by using the at least two reference signal resources. The reference signals or data simultaneously received by the terminal may be simultaneously sent by the network device, or may not be simultaneously sent by the network device. This is not limited in this application.

Therefore, according to the resource management method in this embodiment of this application, the terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can simultaneously receive data sent by the network device by using reference signal resources corresponding to different frequency domain resources, thereby improving communication efficiency.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing describes in detail the resource management method according to the embodiments of this application. The following describes a resource management apparatus according to embodiments of this application.

Figure 4:
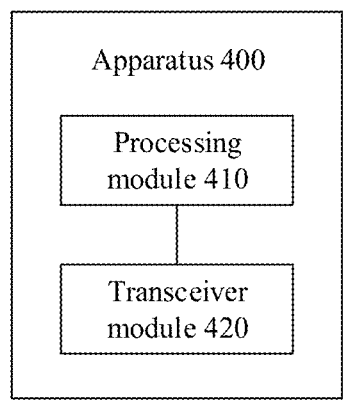
FIG. 4 is a schematic block diagram of a resource management apparatus according to an embodiment of this application.

FIG. 4 is a schematic block diagram of a resource management apparatus 400 according to an embodiment of this application.

It should be understood that the communications apparatus 400 may be a transmit end device. During uplink transmission, the transmit end device corresponds to the terminal in the embodiment shown in FIG. 3, and may have any function of the terminal in the method. During downlink transmission, the transmit end device corresponds to a network device. The uplink transmission is used as an example below for description. The communications apparatus 400 includes a processing module 410 and a transceiver module 420. As shown in FIG. 4, the communications apparatus 400 may be applied to the system shown in FIG. 1, to perform the function of the terminal in the foregoing method embodiment.

The processing module 410 is configured to determine at least two reference signal resources in a plurality of reference signal resources corresponding to at least two frequency domain resources, where the at least two reference signal resources are reference signal resources on which the terminal can simultaneously receive reference signals sent by using the at least two reference signal resources, and the at least two reference signal resources are reference signal resources corresponding to the at least two frequency domain resources.

The transceiver module 420 is configured to simultaneously receive data sent on the at least two reference signal resources.

Optionally, the processing module 410 is specifically configured to:
 determine, as the at least two reference signal resources, reference signal resources that are in the plurality of reference signal resources, that correspond to different frequency domain resources, and on which reference signals are simultaneously received by using a preset receiving parameter.

Optionally, the transceiver module 420 is further configured to send first indication information, where the first indication information is used to indicate the at least two reference signal resources.

Optionally, the first indication information includes a number of each of the at least two reference signal resources, and the number of the reference signal resource is obtained by sequentially numbering all reference signal resources corresponding to the at least two frequency domain resources.

Optionally, the first indication information includes a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

Optionally, the transceiver module 420 is further configured to receive resource configuration information, where the resource configuration information is used to indicate at least one reference signal resource corresponding to each of the at least two frequency domain resources.

Optionally, the resource configuration information includes at least one resource setting corresponding to each of the at least two frequency domain resources, each of the at least one resource setting includes a plurality of resource sets, and each of the plurality of resource sets includes at least one reference signal resource.

Optionally, the resource configuration information includes a first resource set, and the first resource set includes at least one reference signal resource corresponding to each of the at least two frequency domain resources.

Optionally, the resource configuration information includes a first resource setting, the first resource setting includes a resource set corresponding to each of the at least two frequency domain resources, and the resource set includes at least one reference signal resource.

Optionally, the transceiver module 420 is further configured to receive second indication information, where the second indication information is used to indicate a maximum value of a quantity of reference signal resources configured for the terminal.

The processing module 410 is specifically configured to:
 determine the at least two reference signal resources based on the second indication information, where a quantity of the at least two reference signal resources is less than or equal to the maximum value.

Therefore, according to the resource management apparatus in this embodiment of this application, the terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. In this way, the terminal can simultaneously receive data sent by a network device by using reference signal resources corresponding to different frequency domain resources, thereby improving communication efficiency.

Figure 5:
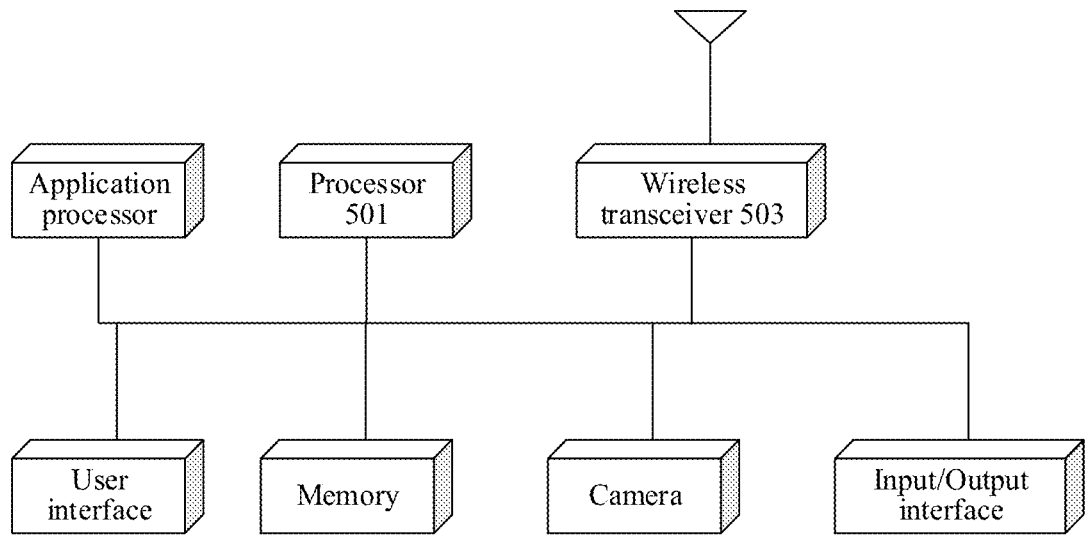
FIG. 5 is a schematic structural diagram of a resource management apparatus according to an embodiment of this application.

When the apparatus 400 in this embodiment is a terminal, the terminal may be of a structure shown in FIG. 5. The terminal includes a processor 501, an application processor, a memory user interface, and some other elements (including a device such as a power supply that is not shown). In FIG. 5, the processing module 410 may be the processor 501, and completes a corresponding function. The transceiver module 420 in the foregoing embodiment may include a receiving module and a sending module. The sending module is configured to send information, and the receiving module is configured to receive information. Specifically, the transceiver module 420 may be a wireless transceiver 503 in the figure, which completes a corresponding function by using an antenna. Specifically, when the transceiver module is configured to receive a signal, the transceiver module may be implemented by a receiver. When the transceiver module is configured to transmit a signal, the transceiver module may be implemented by a transmitter. It may be understood that the elements shown in the figure are merely examples, and are not mandatory elements for implementing this embodiment.

Optionally, if the apparatus 400 is a chip in a terminal, the chip includes a processing module 410 and a transceiver module 420. The transceiver module 420 may be implemented by the transceiver 503, and the processing module 410 may be implemented by the processor 501. The transceiver module 420 includes a receiving module and a sending module. The sending module is configured to send information, and the receiving module is configured to receive information, for example, may be an input/output interface, a pin, or a circuit. Specifically, when the transceiver module 420 sends information, the transceiver module 420 may be implemented by an output interface. When the transceiver module 420 receives information, the transceiver module 420 may be implemented by an input interface. The processing module 410 may execute a computer execution instruction stored in a storage module. The storage module is a storage module in the chip, for example, a register or a cache. The storage module may alternatively be a storage module that is in the terminal and that is located outside the chip, for example, a read-only memory (ROM), another type of static storage device that can store static information and an instruction, or a random access memory (RAM).

For example, the apparatus may be a field programmable gate array (FPGA), an application-specific integrated circuit (ASIC), a system-on-a-chip (SoC), a central processing unit (CPU), a network processor (NP), a digital signal processor (DSP), a micro controller unit (MCU), a programmable logic device (PLD), or another integrated chip.

Figure 6:
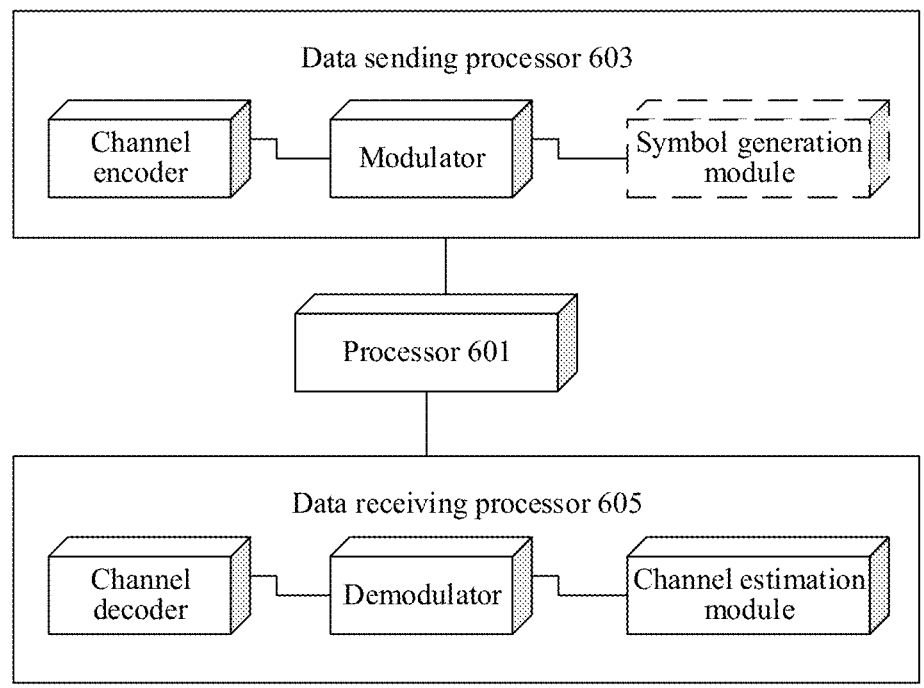
FIG. 6 is a schematic structural diagram of a resource management apparatus according to another embodiment of this application.

When the apparatus 400 in this embodiment is a terminal, the terminal may alternatively be of a structure shown in FIG. 6. In an example, the terminal can implement a function similar to a function of the processor in FIG. 5. In FIG. 6, the terminal includes a processor 601, a data sending processor 603, and a data receiving processor 605. In FIG. 6, the processing module 410 may be the processor 601, and completes a corresponding function. The transceiver module 420 may be the data sending processor 603 or the data receiving processor 605 in FIG. 6. Although a channel encoder and a channel decoder are shown in the figure, it may be understood that the modules are merely examples, and do not constitute a limitation on this embodiment.

Figure 7:
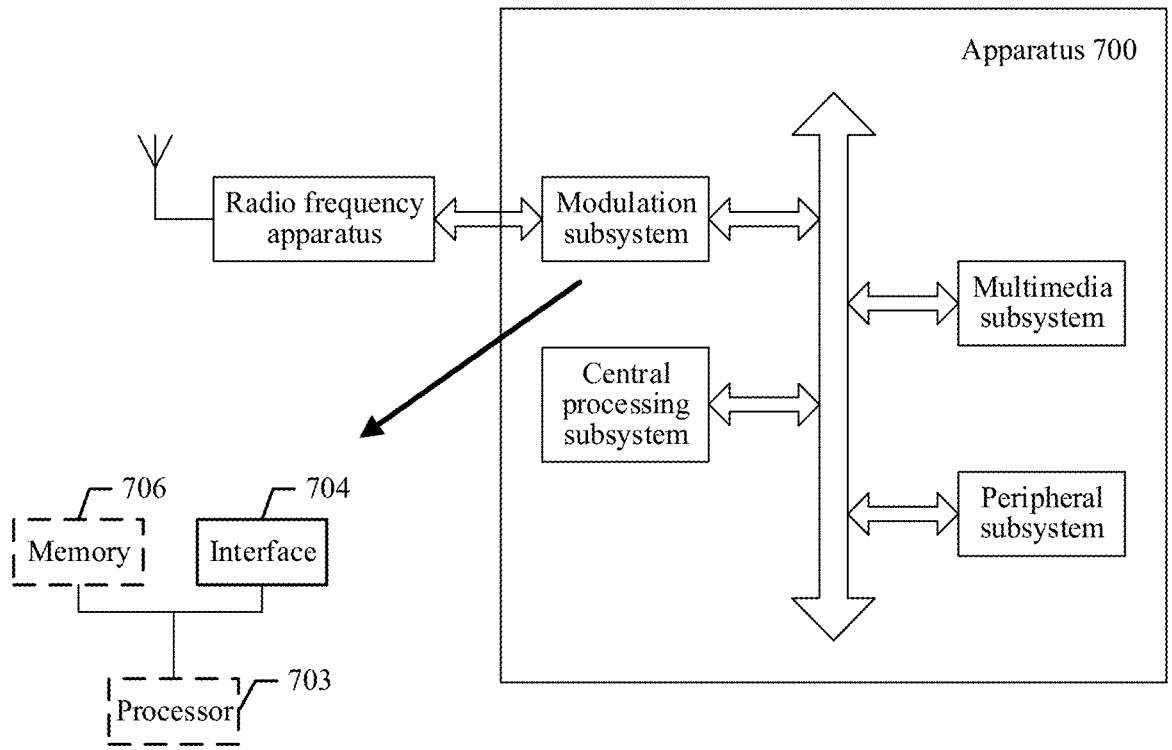
FIG. 7 is a schematic structural diagram of a resource management apparatus according to still another embodiment of this application.

FIG. 7 shows another form of this embodiment. An apparatus 700 includes modules such as a modulation subsystem, a central processing subsystem, and a peripheral subsystem. The apparatus 700 in this embodiment may be used as the modulation subsystem in the apparatus 700. Specifically, the modulation subsystem may include an interface 704. Optionally, the modulation subsystem may further include a processor 703. The processor 703 completes the function of the processing module 410, and the interface 704 completes the function of the transceiver module 420. In another form, the modulation subsystem includes a memory 704, a processor 703, and a program that is stored in the memory and that can be run on the processor. When executing the program, the processor implements the method according to one of the foregoing embodiments. It should be noted that the memory 704 may be nonvolatile or volatile. The memory 704 may be located in the modulation subsystem, or may be located in the apparatus 700, provided that the memory 704 can be connected to the processor 703.

An embodiment of this application further provides a communication apparatus, including a processor and an interface. The processor is configured to perform the resource management method in any one of the foregoing method embodiments.

Figure 8:
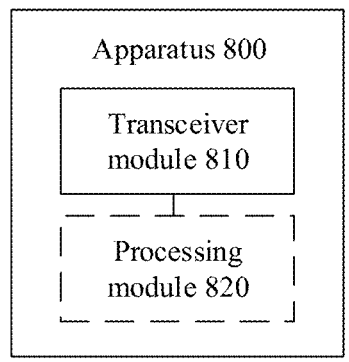
FIG. 8 is a schematic block diagram of a resource management apparatus according to an embodiment of this application.

FIG. 8 is a schematic block diagram of a resource management apparatus 800 according to an embodiment of this application.

It should be understood that the communications apparatus 800 may be a receive end device. During uplink transmission, the receive end device corresponds to the network device in the embodiment shown in FIG. 3, and may have any function of the network device in the method. During downlink transmission, the receive end device corresponds to a terminal. The uplink transmission is used as an example below for description. The network device in the method embodiment shown in FIG. 3 may have any function of the network device in the method. The communications apparatus 800 includes a transceiver module 810. As shown in FIG. 8, the communications apparatus 800 may be applied to the system shown in FIG. 1, to perform the function of the network device in the foregoing method embodiment.

The transceiver module 810 is configured to receive first indication information, where the first indication information is used to indicate at least two reference signal resources, the at least two reference signal resources are determined by a terminal in a plurality of reference signal resources corresponding to at least two frequency domain resources, and the at least two reference signal resources are reference signal resources corresponding to the at least two frequency domain resources.

The transceiver module 810 is configured to simultaneously send data on the at least two reference signal resources.

Optionally, the communications apparatus 800 further includes a processing module 820. The processing module is configured to determine the at least two reference signal resources based on the first indication information.

Optionally, the transceiver module 810 is further configured to send resource configuration information, where the resource configuration information is used to indicate at least one reference signal resource corresponding to each of the at least two frequency domain resources.

Optionally, the resource configuration information includes at least one resource setting corresponding to each of the at least two frequency domain resources, each of the at least one resource setting includes a plurality of resource sets, and each of the plurality of resource sets includes at least one reference signal resource.

Optionally, the resource configuration information includes a first resource set, and the first resource set includes at least one reference signal resource corresponding to each of the at least two frequency domain resources.

Optionally, the resource configuration information includes a first resource setting, the first resource setting includes a resource set corresponding to each of the at least two frequency domain resources, and the resource set includes at least one reference signal resource.

Optionally, the first indication information includes a number of each of the at least two reference signal resources, and the number of the reference signal resource is obtained by sequentially numbering all reference signal resources corresponding to the at least two frequency domain resources.

Optionally, the first indication information includes a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

Optionally, the transceiver module 810 is further configured to send second indication information, where the second indication information is used to indicate a maximum value of a quantity of reference signal resources configured for the terminal.

Therefore, according to the resource management apparatus in this embodiment of this application, the terminal selects the at least two reference signal resources from the plurality of reference signal resources corresponding to the at least two frequency domain resources, where the at least two selected reference signal resources are reference signal resources corresponding to at least two different frequency domain resources. In other words, some of the at least two reference signal resources are selected from a plurality of reference signal resources corresponding to one frequency domain resource, and other reference signal resources are selected from a plurality of reference signal resources corresponding to another frequency domain resource. The terminal indicates the at least two reference signal resources to the network device by using the first indication information. In this way, the network device can simultaneously send data on reference signal resources corresponding to different frequency domain resources, and the terminal can simultaneously receive the data, thereby improving communication efficiency.

It should be understood that the communications apparatus 800 according to this embodiment of this application may correspond to the network device in the method in the embodiment shown in FIG. 3, and the foregoing and other management operations and/or functions of the modules in the communications apparatus 800 are respectively used to implement corresponding steps of the foregoing methods. For brevity, details are not described herein again.

Figure 9:
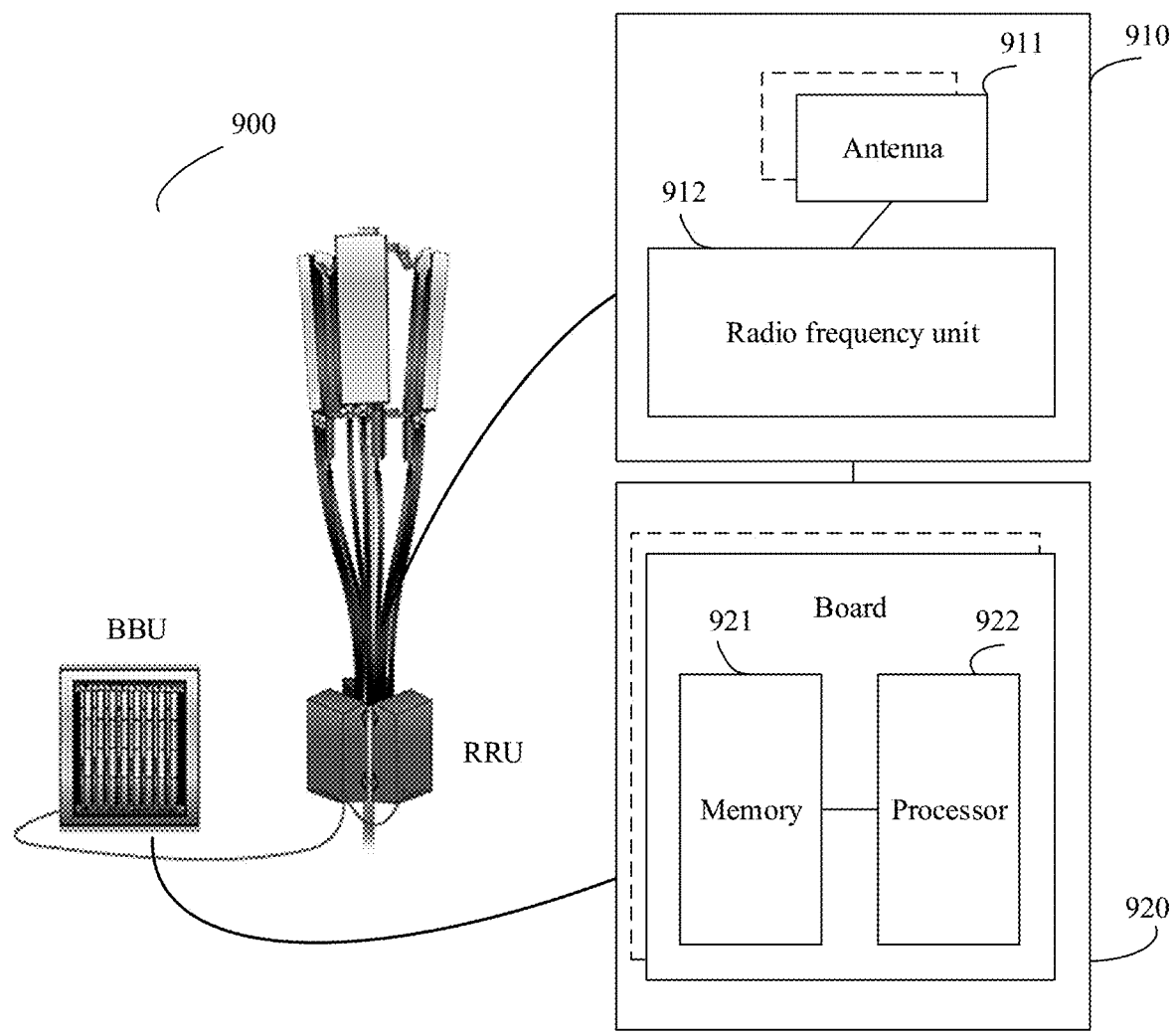
FIG. 9 is a schematic structural diagram of a resource management apparatus according to an embodiment of this application.

Optionally, if the communications apparatus 800 is a network device, the transceiver module 810 in this embodiment of this application may include a receiving module or a sending module. The sending module is configured to send information, and the receiving module is configured to receive information. The transceiver module 810 may be implemented by a transceiver. Alternatively, when the transceiver module is configured to receive a signal, the transceiver module may be implemented by a receiver. When the transceiver module is configured to transmit a signal, the transceiver module may be implemented by a transmitter. The transceiver module 810 may alternatively be a communications port or an interface circuit, to receive and send signals of another module in the communications apparatus or signals of another apparatus outside the apparatus 800. The another apparatus may be a communications device. As shown in FIG. 9, an apparatus 900 includes one or more radio frequency units, for example, a remote radio unit (RRU) 910 and one or more baseband units (BBU) (which may also be referred to as a digital unit (DU)) 920. The RRU 910 may be referred to as a transceiver module, and corresponds to the transceiver module 810 in FIG. 8. Optionally, the transceiver module may also be referred to as a transceiver machine, a transceiver circuit, a transceiver, or the like, and may include at least one antenna 911 and a radio frequency unit 912. The RRU 910 is mainly configured to: receive and send radio frequency signals, and perform conversion between a radio frequency signal and a baseband signal. For example, the RRU 910 is configured to send indication information to a terminal device. The BBU 920 is mainly configured to: perform baseband processing, control a base station, and the like. The RRU 910 and the BBU 920 may be physically disposed together, or may be physically disposed separately, namely, a distributed base station.

The BBU 920 is a control center of the base station, and may also be referred to as a processing module. The BBU 920 may correspond to the processing module 820 in FIG. 8, and is mainly configured to implement a baseband processing function such as channel encoding, multiplexing, modulation, or spreading. For example, the BBU (processing module) may be configured to control the base station to perform an operation procedure related to the network device in the foregoing method embodiments, for example, generate the foregoing indication information.

In an example, the BBU 920 may include one or more boards, and a plurality of boards may jointly support a radio access network (for example, an LTE network) in a single access standard, or may separately support radio access networks (for example, an LTE network, a 5G network, and another network) in different access standards. The BBU 920 further includes a memory 921 and a processor 922. The memory 921 is configured to store a necessary instruction and data. The processor 922 is configured to control the base station to perform necessary actions. For example, the processor 922 is configured to control the base station to perform an operation procedure related to the network device in the foregoing method embodiments. The memory 921 and the processor 922 may serve one or more boards. In other words, a memory and a processor may be separately disposed on each board. Alternatively, a plurality of boards may share a same memory and a same processor. In addition, a necessary circuit may be further disposed on each board.

Optionally, if the apparatus 800 is a chip in a network device, the chip includes a transceiver module 810. Optionally, the chip further includes a processing module 820. As shown in FIG. 9, the transceiver module 810 may be implemented by the RRU 910, and the processing module 820 may be implemented by the BBU 920. The transceiver module 810 includes a receiving module and a sending module. The sending module is configured to send information, and the receiving module is configured to receive information, for example, may be an input/output interface, a pin, or a circuit on the chip. Specifically, when the transceiver module 810 sends information, the transceiver module 810 may be implemented by an output interface. When the transceiver module 810 receives information, the transceiver module 810 may be implemented by an input interface. The processing module 820 may execute a computer execution instruction stored in a storage module. The storage module is a storage module in the chip, for example, a register or a cache. The storage module may alternatively be a storage module that is in the network device and that is located outside the chip, for example, a read-only memory (read-only memory, ROM), another type of static storage device that can store static information and an instruction, or a random access memory (random access memory, RAM).

An embodiment of this application further provides a communication apparatus, including an interface. Optionally, the communication apparatus further includes a processor. The processor is configured to perform the resource management method in any one of the foregoing method embodiments.

Optionally, the processor in the foregoing embodiments may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed and completed by a hardware decoding processor, or performed and completed by a combination of hardware and a software module in a decoding processor. A software module may be located in a mature storage medium in the art, such as a random access memory (RAM), a flash memory, a read-only memory (ROM), a programmable read-only memory, an electrically erasable programmable memory, a register, or the like.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM), and is used as an external cache. According to description that is used as an example instead of a limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and the methods described in this specification aims to include but is not limited to these memories and any memory of another proper type.

Figure 10:
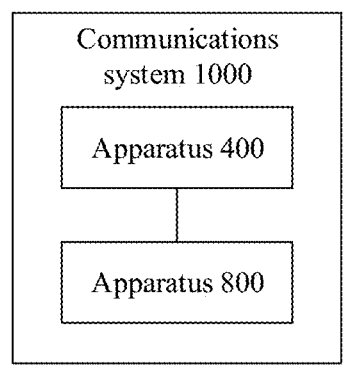
FIG. 10 is a schematic block diagram of a communications system according to an embodiment of this application.

FIG. 10 shows a communications system 1000 according to an embodiment of this application. The communications system 1000 includes:

the apparatus 400 in the embodiment shown in FIG. 4 and the apparatus 800 in the embodiment shown in FIG. 8.

In another form of this embodiment, a computer readable storage medium is provided. The computer readable storage medium stores an instruction. When the instruction is executed, a program instruction in any one of the foregoing methods is executed.

In another form of this embodiment, a computer program product including an instruction is provided. When the computer program product is run on a computer, the computer is enabled to perform any one of the foregoing methods.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification does not mean that particular features, structures, or characteristics related to the embodiment are included in at least one embodiment of the present invention. Therefore, "in one embodiment" or "in an embodiment" that appears throughout the entire specification does not necessarily mean a same embodiment. In addition, these particular features, structures, or characteristics may be combined in one or more embodiments in any proper manner. It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside in a process and/or an execution thread, and a component may be located on one computer and/or distributed between two or more computers. In addition, these components may be executed by various computer readable media that store various data structures. For example, the components may communicate by using a local and/or remote process based on a signal having one or more data packets (for example, data from two components interacting with another component in a local system, a distributed system, and/or across a network such as the internet interacting with another system by using the signal).

It should be further understood that the first, second, third, fourth, and various numbers included in this specification are merely distinguished for convenient description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that units, algorithms, and steps in the examples described with reference to the embodiments disclosed in this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource management method, comprising:
   determining at least two reference signal resources in a plurality of reference signal resources corresponding to at least two frequency domain resources, wherein the at least two reference signal resources are reference signal resources on which a terminal can simultaneously receive reference signals sent using the at least two reference signal resources, and the at least two reference signal resources are reference signal resources corresponding to the at least two frequency domain resources;
   sending first indication information, wherein the first indication information is used to indicate the at least two reference signal resources; and
   simultaneously receiving data sent on the at least two reference signal resources, wherein the first indication information comprises a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

2. The method according to claim 1, wherein the determining at least two reference signal resources in a plurality of reference signal resources corresponding to the at least two frequency domain resources comprises:
   determining, as the at least two reference signal resources, reference signal resources that are in the plurality of reference signal resources that correspond to different frequency domain resources, and on which reference signals are simultaneously received using a preset receiving parameter.

3. The method according to claim 1, wherein the first indication information comprises a number of each of the at least two reference signal resources, and the number of the reference signal resource is obtained by sequentially numbering all reference signal resources corresponding to the at least two frequency domain resources.

4. The method according to claim 1, wherein before the plurality of reference signal resources corresponding to the at least two frequency domain resources are determined, the method further comprises:
receiving resource configuration information, wherein the resource configuration information is used to indicate at least one reference signal resource corresponding to each of the at least two frequency domain resources.

5. The method according to claim 4, wherein the resource configuration information comprises at one of:
at least one resource setting corresponding to each of the at least two frequency domain resources, each of the at least one resource setting comprises a plurality of resource sets, and each of the plurality of resource sets comprises at least one reference signal resource;
a first resource set, and the first resource set comprises at least one reference signal resource corresponding to each of the at least two frequency domain resources; and
a first resource setting, the first resource setting comprises a resource set corresponding to each of the at least two frequency domain resources, and the resource set comprises at least one reference signal resource.

6. The method according to claim 1, wherein the method further comprises:
receiving second indication information, wherein the second indication information is used to indicate a maximum value of a quantity of reference signal resources configured for the terminal; and
the determining at least two reference signal resources in a plurality of reference signal resources corresponding to at least two frequency domain resources comprises:
determining the at least two reference signal resources based on the second indication information, wherein a quantity of the at least two reference signal resources is less than or equal to the maximum value.

7. A resource management method, comprising:
receiving first indication information, wherein the first indication information is used to indicate at least two reference signal resources, the at least two reference signal resources are determined by a terminal in a plurality of reference signal resources corresponding to at least two frequency domain resources, and the at least two reference signal resources are reference signal resources corresponding to the at least two frequency domain resources; and
simultaneously sending data on the at least two reference signal resources, wherein the first indication information comprises a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

8. The method according to claim 7, wherein before the receiving first indication information, the method further comprises:
sending resource configuration information, wherein the resource configuration information is used to indicate at least one reference signal resource corresponding to each of the at least two frequency domain resources.

9. The method according to claim 8, wherein the resource configuration information comprises one of:
resource setting corresponding to each of the at least two frequency domain resources, each of the at least one resource setting comprises a plurality of resource sets, and each of the plurality of resource sets comprises at least one reference signal resource;
a first resource set, and the first resource set comprises at least one reference signal resource corresponding to each of the at least two frequency domain resources; and
a first resource setting, the first resource setting comprises a resource set corresponding to each of the at least two frequency domain resources, and the resource set comprises at least one reference signal resource.

10. The method according to claim 7, wherein the first indication information comprises a number of each of the at least two reference signal resources, and the number of the reference signal resource is obtained by sequentially numbering all reference signal resources corresponding to the at least two frequency domain resources.

11. The method according to claim 7, wherein the method further comprises:
sending second indication information, wherein the second indication information is used to indicate a maximum value of a quantity of reference signal resources configured for the terminal.

12. A resource management apparatus, comprising:
a processor, configured to determine at least two reference signal resources in a plurality of reference signal resources corresponding to at least two frequency domain resources, wherein the at least two reference signal resources are reference signal resources on which a terminal can simultaneously receive reference signals sent using the at least two reference signal resources, and the at least two reference signal resources are reference signal resources corresponding to the at least two frequency domain resources; and
a transceiver, configured to simultaneously receive data sent on the at least two reference signal resources, wherein the transceiver is further configured to send first indication information, wherein the first indication information is used to indicate the at least two reference signal resources, wherein the first indication information comprises a number of each of the at least two reference signal resources and an identifier of a frequency domain resource corresponding to each reference signal resource, and the number of the reference signal resource is obtained by sequentially numbering all reference signal resources corresponding to each of the at least two frequency domain resources.

13. The apparatus according to claim 12, wherein the processor is specifically configured to:
determine, as the at least two reference signal resources, reference signal resources that are in the plurality of reference signal resources, that correspond to different frequency domain resources, and on which reference signals are simultaneously received using a preset receiving parameter.

14. The apparatus according to claim 12, wherein the first indication information comprises a number of each of the at least two reference signal resources, and the number of the reference signal resource is obtained by sequentially numbering all reference signal resources corresponding to the at least two frequency domain resources.

15. The apparatus according to claim 12, wherein the transceiver is further configured to receive resource configuration information, wherein the resource configuration information is used to indicate at least one reference signal resource corresponding to each of the at least two frequency domain resources.

* * * * *